United States Patent
Makovsky et al.

(10) Patent No.: US 10,613,711 B1
(45) Date of Patent: Apr. 7, 2020

(54) SERVICE MANAGEMENT TECHNIQUES

(71) Applicant: ServiceNow, Inc., Santa Clara, CA (US)

(72) Inventors: Bnayahu Makovsky, Kiryat-Ono (IL); Yotam Barak, Ganot Hadar (IL); Amit Arom-Zohar, Santa Cruz, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

(21) Appl. No.: 16/357,002

(22) Filed: Mar. 18, 2019

(51) Int. Cl.
*G06F 3/048* (2013.01)
*G06F 3/0482* (2013.01)
*G06F 11/34* (2006.01)
*G06F 3/0484* (2013.01)

(52) U.S. Cl.
CPC ........ *G06F 3/0482* (2013.01); *G06F 3/04845* (2013.01); *G06F 11/3409* (2013.01)

(58) Field of Classification Search
CPC ....... G06F 3/0482; G06F 3/0484; G06F 11/34
See application file for complete search history.

(56) References Cited

U.S. PATENT DOCUMENTS

| | | | |
|---|---|---|---|
| 7,062,683 B2 | 6/2006 | Warpenburg et al. | |
| 7,610,512 B2 | 10/2009 | Gerber | |
| 7,617,073 B2 | 11/2009 | Trinon et al. | |
| 7,890,802 B2 | 2/2011 | Gerber | |
| 7,945,860 B2 | 5/2011 | Vambenepe et al. | |
| 7,966,398 B2 | 6/2011 | Wiles, Jr. | |
| 8,224,683 B2 | 7/2012 | Manos | |
| 8,674,992 B2 | 3/2014 | Poston et al. | |
| 2013/0325541 A1* | 12/2013 | Capriotti | G06Q 10/20 705/7.21 |
| 2014/0089818 A1* | 3/2014 | Andler | G06Q 50/01 715/753 |
| 2015/0143248 A1* | 5/2015 | Beechuk | H04L 67/10 715/739 |
| 2018/0287856 A1* | 10/2018 | Whitner | H04L 67/10 |
| 2018/0302266 A1 | 10/2018 | Makovsky et al. | |
| 2018/0302272 A1 | 10/2018 | Makovsky | |
| 2018/0309634 A1 | 10/2018 | Makovsky | |
| 2019/0052531 A1 | 2/2019 | Sividia et al. | |

OTHER PUBLICATIONS

U.S. Appl. No. 15/723,717, filed Oct. 3, 2017, Makovsky.
U.S. Appl. No. 15/928,869, filed Mar. 22, 2018, Biran.

* cited by examiner

*Primary Examiner* — David E Choi
(74) *Attorney, Agent, or Firm* — Fletcher Yoder PC

(57) ABSTRACT

A system may include a cloud service platform accessible by a client device via a client network. The cloud service platform may provide a graphical user interface (GUI) to the client device and receive an indication of one or more service records associated with an enterprise from a database and generate the GUI for display on the client devices. The GUI may have a services dashboard including one or more graphical icons representative of respective service records of the service records. The cloud service platform may also receive one or more user inputs indicative of an adjustment to an amount of graphical icons displayed in the services dashboard from the client device, and dynamically modify an appearance of the graphical icons based on the user inputs. The appearance of the graphical icons may be indicative of one or more types of data associated with the respective service records.

15 Claims, 19 Drawing Sheets

FIG. 19

SERVICES DASHBOARD × | PAYROLL ×  [+]

DETAILS

SERVICE MAP                                                                                    EDIT SERVICE

⊙ STATUS IN PROGRESS    APPLICATION OWNER DAWN DEAN    INCIDENTS 2    PROBLEMS 3

DETAILS  ENTRY POINTS  CI LIST  RELATED ALERTS (8)  RELATED INCIDENTS (1)  RELATED PROBLEMS (1)  MORE ▽

GENERAL INFO

SERVICE NAME                BUSINESS CRITICALITY
HOTEL BOOKING               4-NOT CRITICAL

OWNED BY                    PROGRESS STATUS
DAWN DEAN                   IN PROGRESS

OPERATIONAL STATUS          ☑ TRAFFIC BASED DISCOVERY
OPERATIONAL

SEVERITY
CRITICAL

CONTENT TBD

SERVICE MANAGEMENT TECHNIQUES

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are may access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques facilitate better management and maintenance of a network of components by a user. Specifically, the disclosed techniques provide a user with a customizable GUI for a dashboard from which the user may access data associated with one or more services of an enterprise. The dashboard may facilitate identification of issues associated with the services of the enterprise, analyze the impact of each issue, and facilitate resolution of each issue. For example, the dashboard may present an overview of the services within an enterprise. The dashboard may represent each service in the enterprise as an individual tile and facilitate grouping and sorting of the services (i.e., tiles) by various attributes (e.g., (e.g., location, type, issue severity, priority) associated with the services. The dashboard may also be configured by the user to present more data or less data associated with a respective service by increasing or decreasing the size of the tile displayed. For example, a small tile representation of the service may indicate the severity of issues impacting the service, and a large tile representation of the service may indicate the severity of issues impacting the service and a key performance indicator ("KPI") associated with the service.

The dashboard may also facilitate filtering of the services by issue. For example, the user may select a particular issue affecting one or more services of the enterprise and the dashboard may display the services affected by the selected issue while hiding those services not affected by the selected issue. Additionally, the user may be able to access additional details associated with each service based on one or more interactions performed by the user with the service (e.g., tile). For example, the user may hover a mouse arrow over the tile representing the service to display a snapshot view of the service indicating one or more attributes of the service. The user may also select the tile representing the service to display a service preview window (e.g., as an overlay) that contains additional data associated with the service as compared to the snapshot view. From the service preview window, the user may access a service record, a service map, or both, associated with the service to access additional data associated with the service. As such, the disclosed techniques facilitate better management and maintenance of the services of an enterprise by providing the user with full flexibility in adjusting the amount of data and the type of data associated with the services displayed to the user via the dashboard. Additionally, the disclosed techniques provide the user with access to various tools to identify issues associated with the services, analyze the impact of each issue, and facilitate resolution of each issue from the dashboard.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 19 illustrates a service record that may be accessed by the user from the service preview window of FIG. 17, in accordance with aspects of the present disclosure.

DETAILED DESCRIPTION

Figure 1:
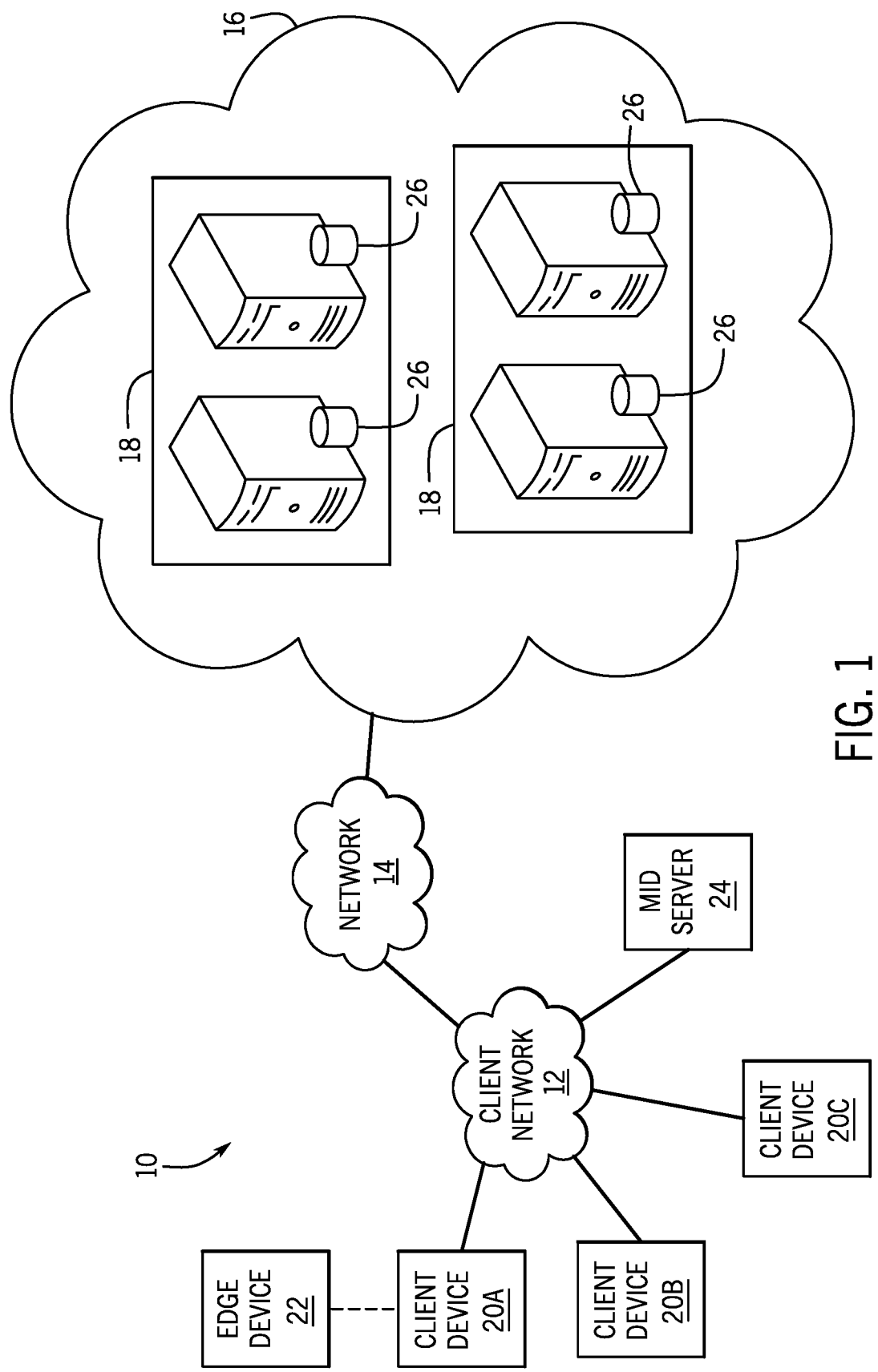
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB. As used herein, the terms alerts, incidents (INTs), changes (CHGs), and problems (PRBs) are used in accordance with the generally accepted use of the terminology for CMDBs. Moreover, the term "issues" with respect to a CI of a CMDB collectively refers to alerts, INTs, CHGs, and PRBs associated with the CI.

Information Technology (IT) networks may include a number of computing devices, server systems, databases, and the like that generate, collect, store, and distribute data. Graphical user interfaces (GUIs) may provide interactive objects for viewing and manipulating by a user that may facilitate usage of this data. As GUIs become increasingly complex, it may be more difficult to discern characteristics of the GUIs' interactive objects.

With this in mind, an IT system may include service mapping logic that generates an accurate, service-aware view (e.g., a "service mapping") of the system infrastructure that is frequently refreshed, keeping the view up to date. The service mapping may be constructed by discovering and mapping relationships between the IT infrastructure for service-affecting changes and update the service mapping in real-time. The service mapping may provide a mix of applications and IT components that support a service and provide an understanding of how these application and components are related.

The disclosed techniques facilitate better management and maintenance of a network of components by a user. Specifically, the disclosed techniques provide a user with a customizable GUI for a dashboard from which the user may access data associated with one or more services of an enterprise. The dashboard may facilitate identification of issues associated with the services of the enterprise, analyze the impact of each issue, and facilitate resolution of each issue. For example, the dashboard may present an overview of the services within an enterprise. The dashboard may represent each service in the enterprise as an individual tile and facilitate grouping and sorting of the services (i.e., tiles) by various attributes (e.g., (e.g., location, type, issue severity, priority) associated with the services. The dashboard may also be configured by the user to present more data or less data associated with a respective service by increasing or decreasing the size of the tile displayed. For example, a small tile representation of the service may indicate the severity of issues impacting the service, and a large tile representation of the service may indicate the severity of issues impacting the service and a key performance indicator ("KPI") associated with the service.

The dashboard may also facilitate filtering of the services by issue. For example, the user may select a particular issue affecting one or more services of the enterprise and the dashboard may display the services affected by the selected issue while hiding those services not affected by the selected issue. Additionally, the user may be able to access additional details associated with each service based on one or more interactions performed by the user with the service (e.g., tile). For example, the user may hover a mouse arrow over the tile representing the service to display a snapshot view of the service indicating one or more attributes of the service. The user may also select the tile representing the service to display a service preview window (e.g., as an overlay) that contains additional data associated with the service as compared to the snapshot view. From the service preview window, the user may access a service record, a service map, or both, associated with the service to access additional data associated with the service. As such, the disclosed techniques facilitate better management and maintenance of the services of an enterprise by providing the user with full flexibility in adjusting the amount of data and the type of data associated with the services displayed to the user via the dashboard. Additionally, the disclosed techniques provide the user with access to various tools to identify issues associated with the services, analyze the impact of each issue, and facilitate resolution of each issue from the dashboard.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
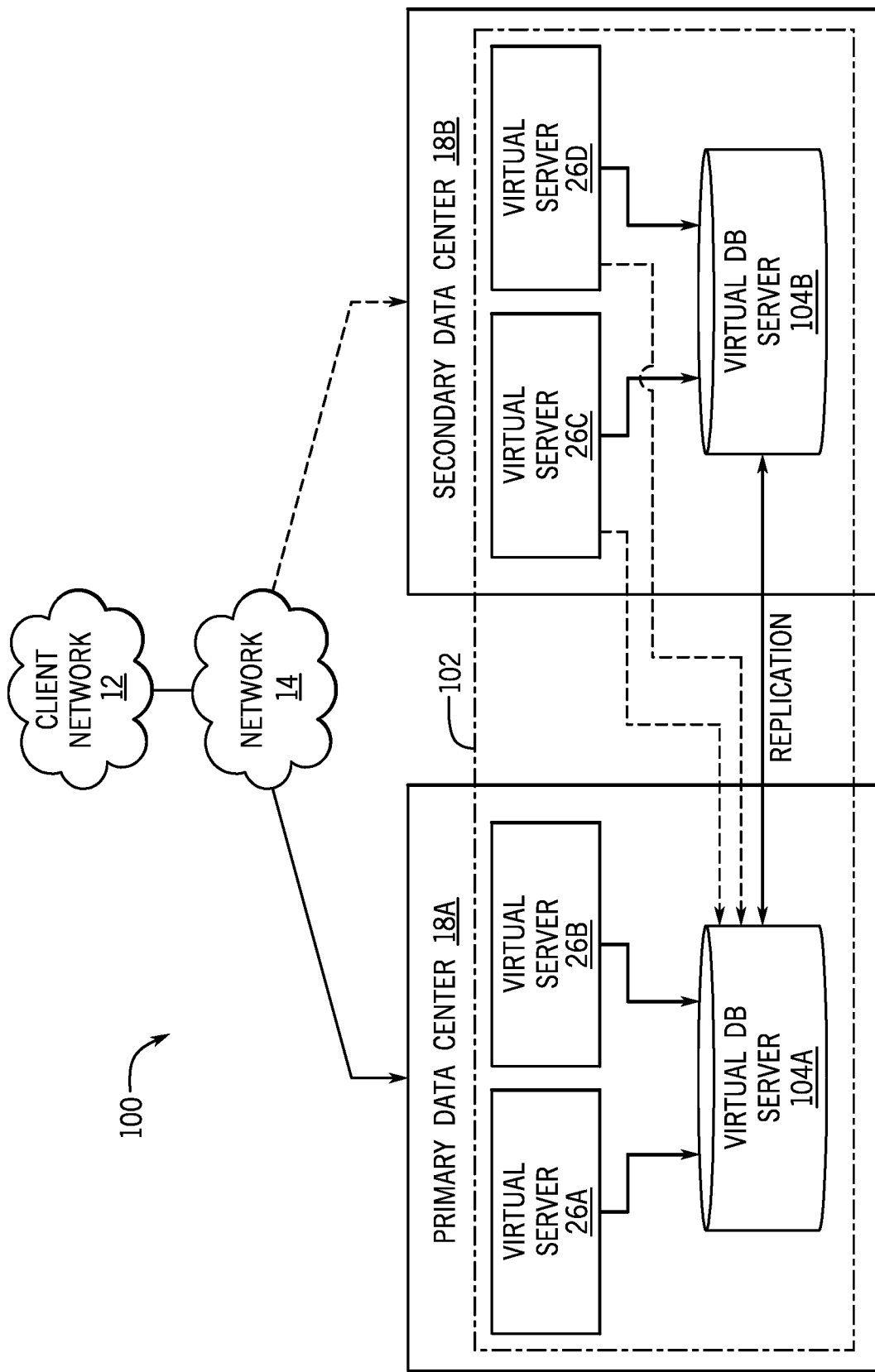
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
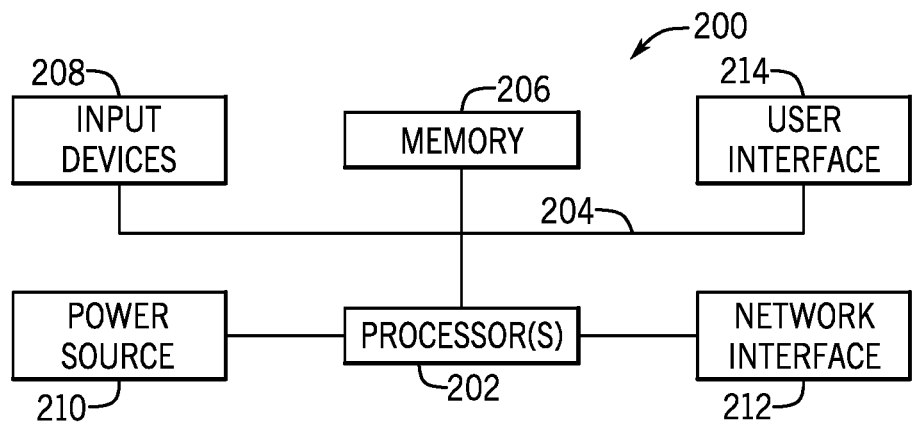
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
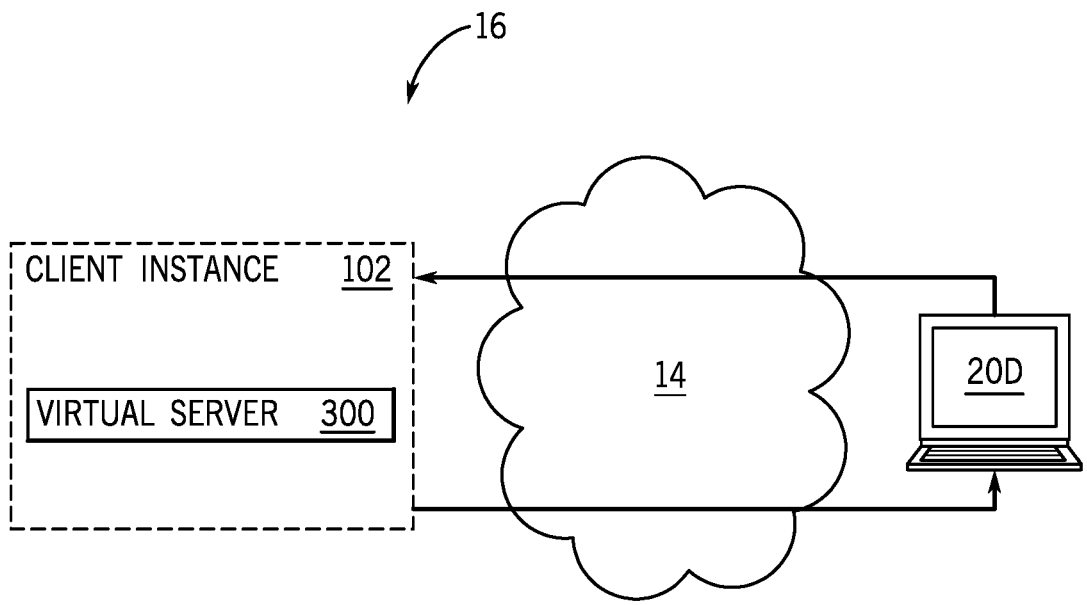
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2 and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
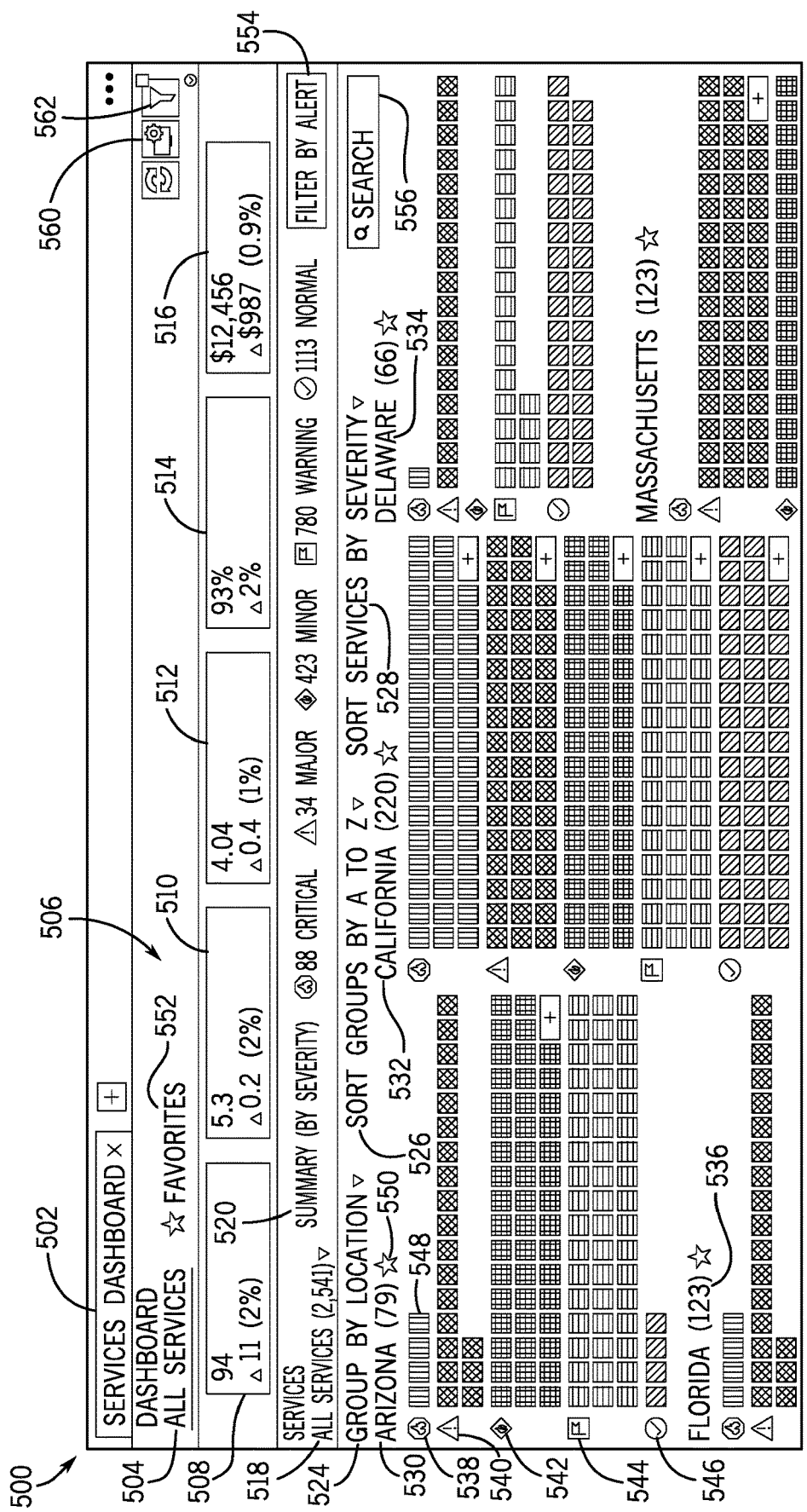
FIG. 5 illustrates an exemplary graphical user interface (GUI) associated with a services dashboard that displays various types of data associated with one or more services of an enterprise, in accordance with aspects of the present disclosure.
Figure 6:
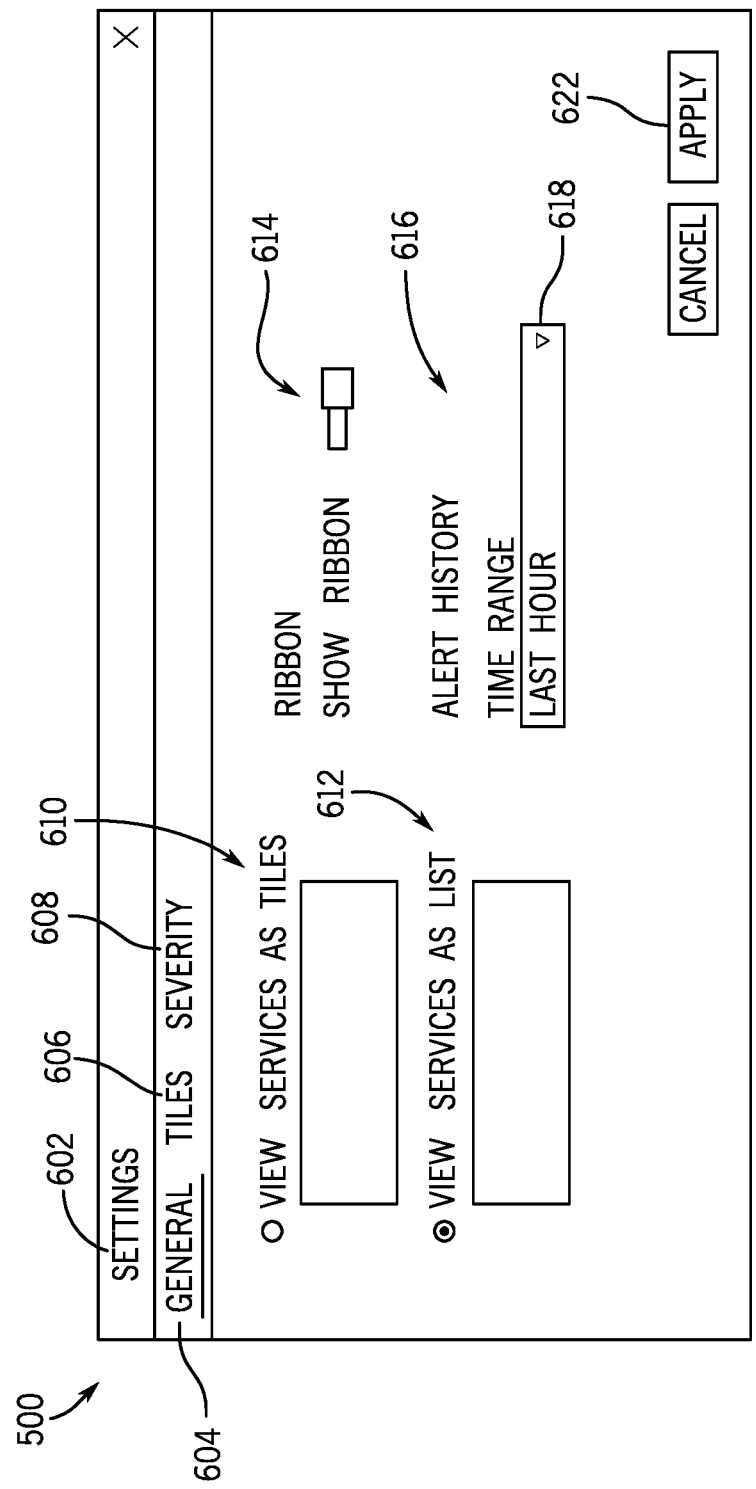
FIG. 6 illustrates a settings window displaying various customization options in response to a selection of a settings icon in the services dashboard of FIG. 5, in accordance with aspects of the present disclosure.

FIG. 5 illustrates a graphical user interface (GUI) 500 of a services dashboard 502 that displays various types of data associated with one or more services of an enterprise to a user. As used herein, a "dashboard" refers to a GUI screen on which data is visualized to enable interactivity with the visualized data. Although FIG. 5 illustrates a single services dashboard 502, it should be appreciated that multiple dashboards corresponding to respective enterprises and their services may be displayed by the GUI 500. For example, when GUI 500 displays data associated with the services dashboard 502 of a particular enterprise, the data associated with services of another enterprise may be loaded in a different tab but not concurrently displayed by GUI 500 in the same manner.

In the illustrated embodiment, the services dashboard 502 may include multiple tabs for displaying data associated with one or more services in an enterprise. A services tab 504 (e.g., "All Services" tab) may present various types of data associated with the services. The services tab 504 may include a ribbon 506 or a banner of various key performance indicators (KPIs) 508, 510, 512, 514, 516 associated with the services of the enterprise. For example, the KPI 508 may indicate the quantity of primary issues (e.g., alerts) associated with the services of the enterprise and a trend in the quantity of issues over a given period of time; the KPI 510 may indicate the average response time of an issue and a trend in the average response time over a given period of time; the KPI 512 may indicate the average resolution time of an issue and a trend in the average resolution time over a given period of time; the KPI 514 may indicate noise reduction (e.g., the reduction of duplicate issues) associated with the services of the enterprise and a trend in noise reduction over a given period of time; and the KPI 516 may indicate the average cost of impact the issues may have on the enterprise. Although FIG. 5 illustrates the KPIs described above, it should be understood that in other embodiments, other suitable KPIs may be displayed to the user in addition to or instead of the KPIs described above.

In the illustrated embodiment, the services dashboard 502 may display all services associated with the enterprise. In some embodiments, the services dashboard 502 may display all services associated with the enterprise as default when the user views the services dashboard 502. In other embodiments, the user may customize the default view of the services dashboard 502 to display any group or subset of services defined by the user.

For example, the services dashboard 502 may facilitate organization of the services into one or more groups or folders such that the user may create an organizational structure of the services according to the user's preferences. For example, the user may select a defined group of services from a configurable organizational tree 518 (e.g., a drop-down list) of grouped services. The user may define sub-groups or sub-folders of an "All Services" group or folder that are organized based on the relationships between the sub-groups (e.g., group→sub-group→sub-sub-group or parent→child). After selecting a group of services from the configurable organizational tree 518, the GUI 500 may display the services associated with the selected group of services and not display the services not associated with the selected group of services. For example, the user may select a "Holiday Readiness" sub-group with 294 services of the group "All Services" with 2,541 services. After the user has selected the "Holiday Readiness" sub-group, the GUI 500 may display the 294 services associated with the "Holiday Readiness" sub-group in the services dashboard 502 instead of the 2,541 services associated with the "All Services" group.

The services dashboard 502 may also display a series of graphical icons that represent each displayed service. In the illustrated embodiment, for example, each service is represented by a square tile 548. However, it should be understood that in other embodiments, other suitable graphical icons may represent each displayed service. For example, the graphical icon may be any other suitable shape (e.g., circular, rectangular, pentagonal, hexagonal, heptagonal, or the like).

The services dashboard 502 may provide one or more organization levels of the displayed services such that the user may customize the manner in which the services are displayed in the services dashboard 502. The services dashboard 502 may include a first selectable option 524 to group the services by a first attribute with the services (e.g., location, owner, type, domain, department, severity, priority, or the like). In the illustrated embodiment, for example, the services are grouped by their respective locations. The group "Arizona" 530 includes 79 services displayed as tiles; the group "California" 532 includes 220 services displayed as tiles; the group "534" includes 66 services displayed as tiles; and the group "Florida" includes 123 services displayed as tiles.

Within each group of services, the user may further customize the services dashboard 502 to sort each group of services by a second attribute associated with the services (e.g., severity, priority, or the like) via a second selectable option 528. In the illustrated embodiment, for example, the services are grouped by location and are further sorted within each group by severity of issues impacting the services. One or more rows of services (i.e., tiles) may be displayed in series next to a graphical icon indicative of a particular severity level. For example, within the group "Arizona" 530, four tiles are displayed in series next to a "Critical" severity level graphical icon 538, twenty tiles are displayed in series next to a "Major" severity level graphical icon 540, sixty-one tiles are displayed in series next to a "Minor" severity level graphical icon 542, fifty-one tiles are displayed in series next to a "Warning" severity level graphical icon 544, and four tiles are displayed in series next to a "Normal" severity level graphical icon 546. The tiles displayed in series next to their respective severity level graphical icons may share a common color scheme or pattern such that the user may easily associate the appearance of the tile with a corresponding severity level. For example, red tiles may correspond to services having an issue categorized as critical severity represented by the "Critical" severity level graphical icon 538, orange tiles may correspond to services having an issue categorized as major severity represented by the "Major" severity level graphical icon 538, yellow tiles may correspond to services having an issue categorized as minor severity represented by the "Minor" severity level graphical icon 538, blue tiles may correspond to services having an issue categorized as a warning represented by the "Warning" severity level graphical icon 538, and green tiles may correspond to services having no issue (i.e., normal) represented by the "Normal" severity level graphical icon 538.

In another embodiment, the services may be grouped by location and further sorted within each group by a priority rating associated with each service, each issue, or both. For example, one or more rows of services (i.e., tiles) may be displayed in series next to a graphical icon indicative of a particular priority level (e.g., 1, 2, 3, 4). The tiles may be displayed in series based on their respective severity level. For example, next to a graphical icon indicative of a first priority level, the services having an issue with a critical severity level may be displayed in series, followed by the services having an issue with a major severity level, and so on. Similarly, next to a graphical icon indicative of a second priority level, the services having an issue with a critical severity level may be displayed in series, followed by the services having an issue with a major severity level, and so on. In this way, the organization of the services within each organizational level may be intuitive to the user such that the user may easily associate the appearance or the position of the tiles with corresponding attributes of each service. For example, as described above, each tile may share a common color scheme or pattern that corresponds with a particular severity level associated with an issue impacting the service.

In some embodiments, the number of tiles displayed in the rows corresponding to a particular severity level may be capped at a defined quantity. In some embodiments, a graphic indicative of the tiles not displayed due to the limit may be indicated at the end of each series of tiles. In the illustrated embodiment, for example, the GUI 500 displays forty-nine of the sixty-one services having an issue categorized as a minor severity level. At the end of the series of tiles, a graphical indication of the number of additional tiles (i.e., services) is present. In some embodiments, the user may select the graphical indication to display the additional tiles not currently shown.

Within each sorted group of services, the user may further customize the services dashboard 502 to sort the rows of services by a third attribute associated with the services (e.g., alphabetical, reverse alphabetical, number of critical sub-services, number of sub-services, or the like) via a second selectable option 528. In the illustrated embodiment, for example, the tiles within each row are sorted alphabetically from A to Z as indicated by the second selectable option 528. By providing the user with various customization options to adjust how the data associated with the services is presented to the user, the services dashboard 502 provides the user with full flexibility in determining how the data is displayed and organized so that the user may better understand and act upon the data presented to the user via the services dashboard 502. As such, the disclosed techniques provided herein may increase an efficiency in facilitating the identification of issues associated with the services of the enterprise, analyzing the impact of each issue, and facilitating resolution of each issue using the GUI 500.

The GUI 500 may also provide additional options to customize the amount of data or the type of data associated with the services that are displayed to the user via the services dashboard 502. In the illustrated embodiment, the user may select a settings graphical icon 560 to display a setting window with various customization options as described herein. Additional details with regard to the settings window is described below with reference to FIGS. 6 to 10. The user may also "favorite" a particular group of services displayed in the services dashboard 502 via a star graphical icon 550 for a quick and easy view of the favorited group of services in a favorites tab 552 of the service dashboard 502. Additional details with regard to the favorites tab 552 and the star graphical icon 550 is described below with reference to FIG. 11. The user may filter the services displayed in the services dashboard 502 by a particular issue (e.g., alert) affecting one or more of the services by selecting a filter by alert option 554. Additional details with regard to filtering services by alert is described below with reference to FIGS. 12-14. The user may also select a filter graphical icon 562 to adjust the services displayed to the user via a customizable global filter. Additional details with regard to the global filter is described below with reference to FIG. 15. Further, the user may input a search query into a search field 556 to display services associated with the search query (e.g., name, location, severity, priority, or the like). Additional details with regard to the search query is described below with reference to FIG. 16.

In some embodiments, after the user has adjusted a customization option of the services dashboard 502 as described herein, the GUI 500 may dynamically adjust the presentation of the services displayed to the user in the services dashboard 502 such that the services are displayed in the services dashboard 502 in an organized manner according to the user-selected or user-adjusted customization features. For example, as described above, the number of tiles displayed in the rows corresponding to a particular severity level may be capped at a defined quantity. The GUI 500 may implement this limit on the number of services displayed to the user after each customization implemented by the user. The GUI 500 may also automatically increase or decrease the size of the tiles based on the number of services displayed to the user in the services dashboard 502. For example, if the services dashboard 502 has more space to increase the size of each tile displayed, the GUI 500 may display the tiles in the services dashboard 502 accordingly. In some embodiments, the size of the tiles corresponds to the amount of additional data associated with the services that may be displayed in the tiles. For example, larger tiles may include additional data (e.g., KPIs, attributes, or the like) associated with a respective service or a respective issue associated with the service than smaller tiles. In some embodiments, the user may manually adjust the size of the tiles to display more or less data associated with the services. Additional details with regard to manual adjustment of the size of the tiles is discussed below with reference to FIGS. 7-9.

The service dashboard 502 may also display a summary 520 of the quantity of services having a particular attribute (e.g., severity, priority). In the illustrated embodiment, for example, the summary 520 may indicate the number of services, the percentage of total services, or both, having an issue categorized as critical, having an issue categorized as major, having an issue categorized as minor, having an issue categorized as a warning, and having no issues (e.g., categorized as normal). The summary 520 may also provide the user with a quick guide for associating the graphical representation of each tile to a corresponding attribute.

As described above, FIG. 6 illustrates a settings window 602 displayed by the GUI 500 and presenting various customization options associated with the services dashboard 502 in response to a user selection of the settings graphical icon 560 in the services dashboard 502. The settings window 602 may provide various tabs 604, 606, 608 that the user may select to display different types of customization options. In the illustrated embodiment, for example, the setting window 602 may display the customization options in the "General" settings tab 604. The user may select between an option 610 to display each service as a tile 548 in the services dashboard 502 and an option 612 display each service in a list in the services dashboard 502. After the user selects option 610 and selects the "apply" option 622 to confirm the user's selection, the GUI 500 may adjust the presentation of the services in the services dashboard 502 to the "tile" view. Similarly, after the user selects option 612 and selects the "apply" option 622 to confirm the user's selection, the GUI 500 may adjust the presentation of the services in the services dashboard 502 to the "list" view.

Additionally, the user may also adjust whether the services dashboard 502 displays the ribbon 506 of KPIs via toggle graphic 614. For example, the user may toggle between displaying the ribbon 506 of KPIs and not displaying the ribbon 506 of KPIs by selecting the toggle graphic 614 and selecting the "apply" option 622 to confirm the user's selection. The user may also adjust the time range for displaying services impacted by an issue (e.g., alert) in the services dashboard 502 by selecting a corresponding time range from a drop-down list 618. For example, the drop-down list 618 may include options for displaying the last five minutes, the last thirty minutes, the last hour, the last two hours, the last eight hours, the last twenty-four hours, the last two days, the last week, or the like. After the user selects a particular option from the drop-down list 618 and selects the "apply" option 622 to confirm the user's selection, the GUI 500 may display the services impacted by issues within the selected time range.

Figure 7:
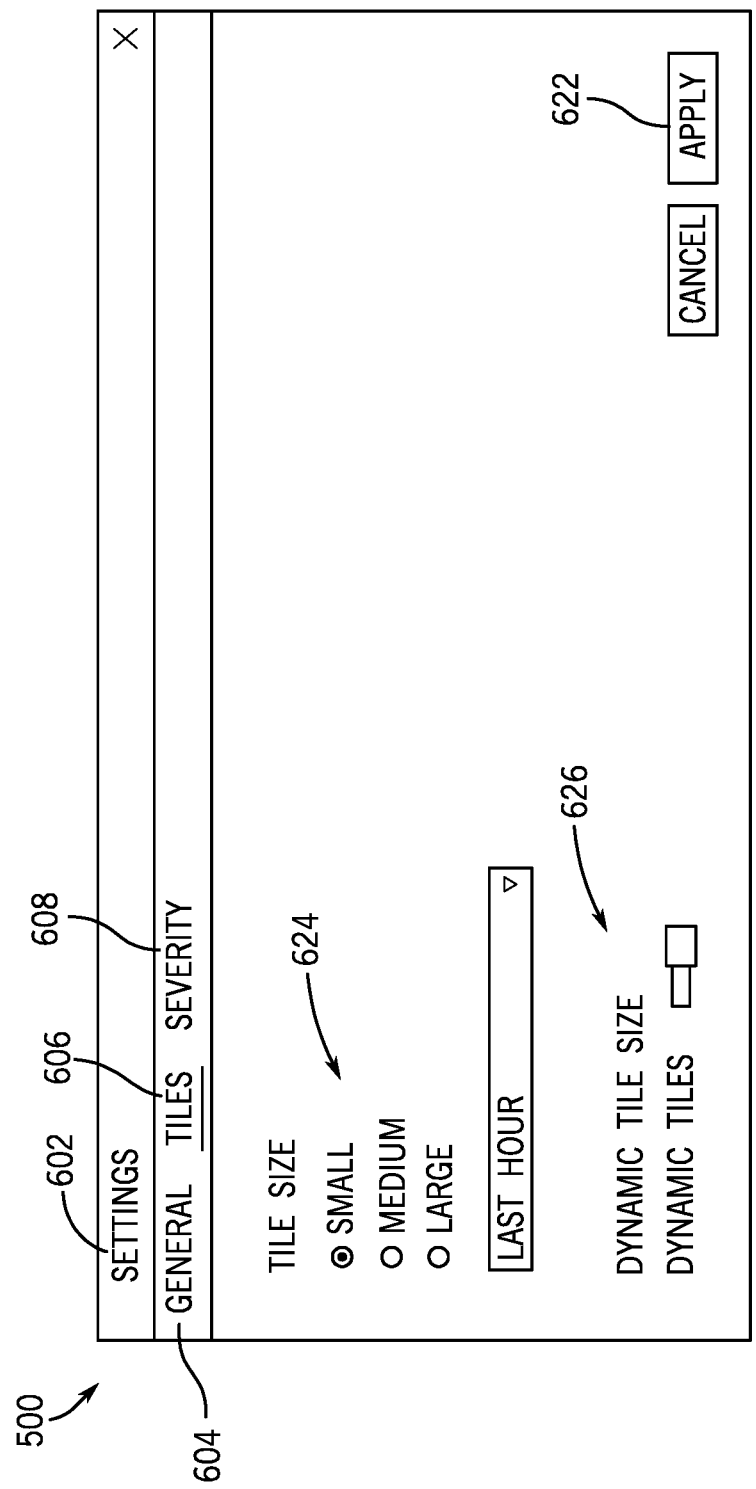
FIG. 7 illustrates the settings window of FIG. 6 displaying additional customization options associated with the services dashboard of FIG. 5, in accordance with aspects of the present disclosure.

Additionally, FIG. 7 illustrates the settings window 602 displaying other various customization options associated with the services dashboard 502 via the "Tiles" settings tab 606. As described above, the user may manually adjust the size of the tiles 548 in the services dashboard 502 to display more data or less data associated with each service. In the illustrated embodiment, the user may select between options 624 indicative of a small tile size, a medium tile size, or a large tile size. For example, after the user selects the option for the small tile size and selects the "apply" option 622 to confirm the user's selection, the GUI 500 may adjust the appearance of each tile in the services dashboard 502 to correspond to the small tile size selection. Similarly, after the user selects the option for the medium tile size and select the "apply" option 622 to confirm the user's selection, the GUI 500 may adjust the appearance of each tile in the services dashboard 502 to correspond to the medium tile size selection. Further, after the user selects the option for the large tile size and selects the "apply" option 622 to confirm the user's selection, the GUI 500 may adjust the appearance of each tile in the services dashboard 502 to correspond to the large tile size selection.

Figure 8:
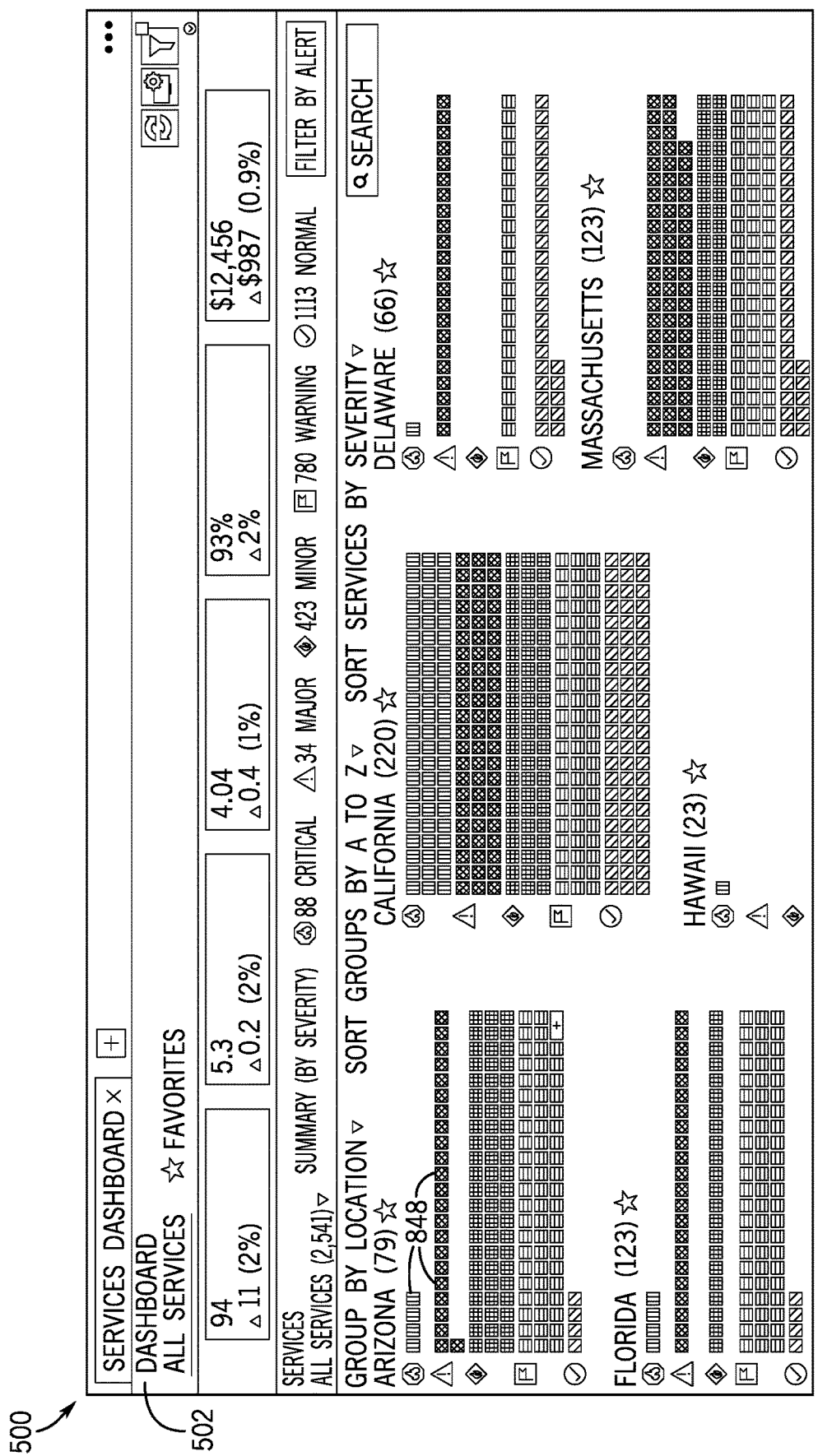
FIG. 8 illustrates the services dashboard of FIG. 5 displaying small tiles representative of respective services, in accordance with aspects of the present disclosure.
Figure 9:
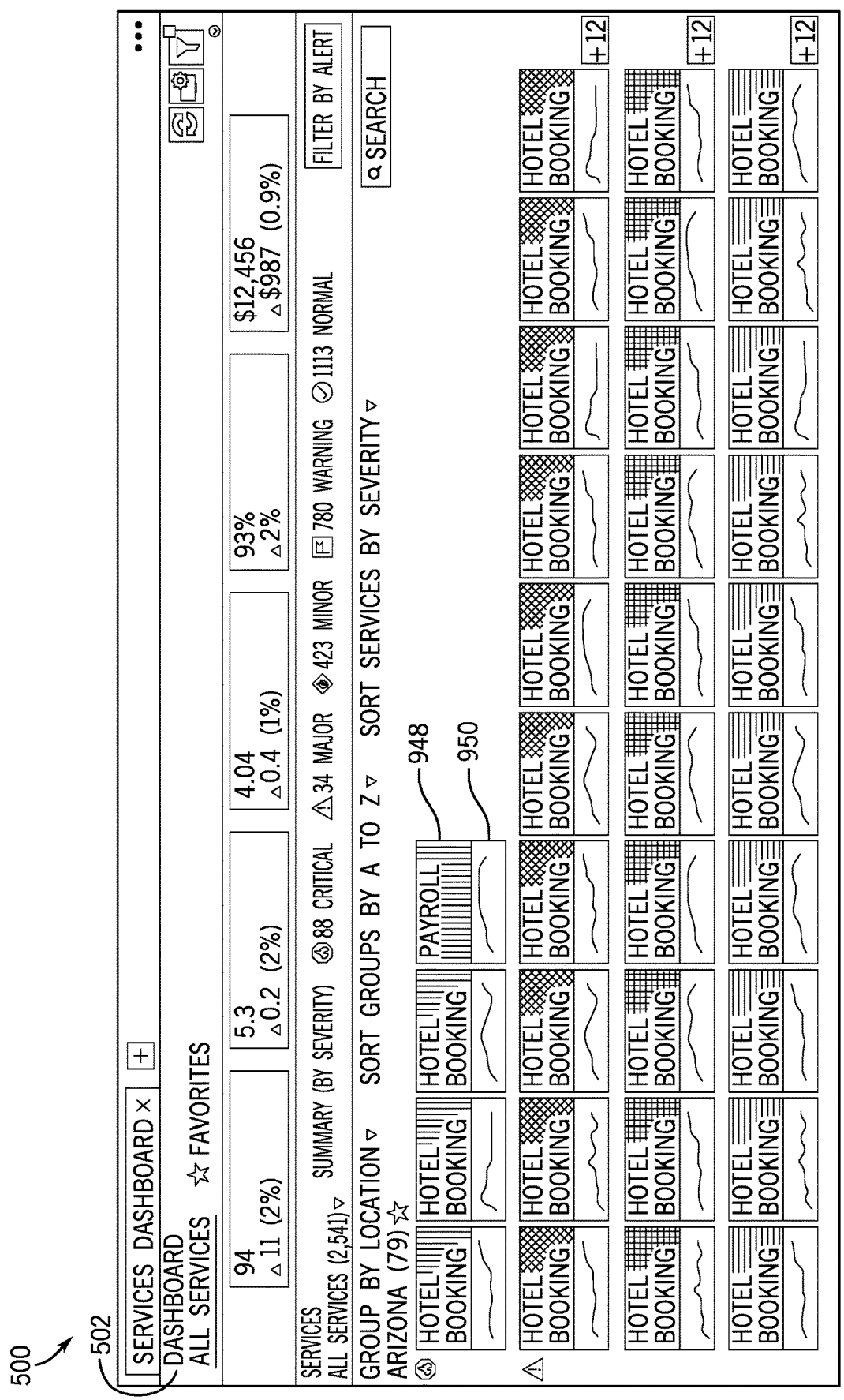
FIG. 9 illustrates the services dashboard of FIG. 5 displaying large tiles representative of respective services, in accordance with aspects of the present disclosure.

Additionally, the amount of data and/or the type of data represented by the appearance of the tile may adjust based on the size of the tile. For example, FIG. 8 illustrates the appearance of each tile 848 in the services dashboard 502 corresponding to the small tile size selection. Each tile 848 may indicate the severity of the issue impacting the service represented by the tile 848. As described above, red tiles may correspond to services having an issue categorized as critical severity represented by the "Critical" severity level graphical icon 538, orange tiles may correspond to services having an issue categorized as major severity represented by the "Major" severity level graphical icon 538, yellow tiles may correspond to services having an issue categorized as minor severity represented by the "Minor" severity level graphical icon 538, blue tiles may correspond to services having an issue categorized as a warning represented by the "Warning" severity level graphical icon 538, and green tiles may correspond to services having no issue (i.e., normal) represented by the "Normal" severity level graphical icon 538. Additionally, FIG. 5 illustrates the appearance of each tile 548 in the services dashboard 502 corresponding to the medium tile size selection. Similar to the small tile representation, each tile 548 may indicate the severity of the issue impacting the service represented by the tile but also include one or more additional types of data associated with the service (e.g., a minimalistic view of the service map associated with the service). Further, FIG. 9 illustrates the appearance of each tile 948 in the services dashboard 502 corresponding to the large tile size selection. Similar to the small tile and medium tile representations, each tile 548 may indicate the severity of the issue impacting the service represented by the tile but also include the additional data indicated by the medium tile size as well as additional data not indicated by the medium tile size. For example, each tile 548 with a large tile appearance may include a minimalistic view of the service map associated with the service and a KPI 950 associated with the service, an issue associated with the service, or both.

Referring back to FIG. 7, the user may also toggle a dynamic tile size setting 626 on or off. For example, when the user has toggled the dynamic tile size setting 626 on, the GUI 500 may dynamically adjust the size of each tile displayed to the user based on the number of services displayed in the services dashboard 502. If the services dashboard 502 has display space to facilitate an increased size of each tile displayed, the GUI 500 may automatically increase the size of each tile in the services dashboard 502 accordingly. If the services dashboard 502 does not have enough display space to facilitate the number of services selected by the user, the GUI 500 may automatically decrease the size of each tile in the services dashboard 502 accordingly. In some embodiments, the size of the tile may have a lower limit and an upper limit such that the size of the tile may not be adjusted smaller than the lower limit or larger than the upper limit. In this way, the GUI 500 may maintain the readability of each tile by the user in the services dashboard 502.

The GUI 500 may also adjust the amount of data and/or the type of data displayed within each tile as the size of the tile is adjusted from smaller to larger or larger to smaller. For example, as GUI 500 increases the size of the tile displayed within the services dashboard 502, additional data associated with the service may be displayed within the tile and/or different types of data associated with the service may be displayed within the tile. In one embodiment, the size of the tile may increase from a small tile to a medium tile. In such an embodiment, the GUI 500 may adjust the appearance of the tile to display a minimalistic view of the service map associated with the service within the medium tile and provide an indication of the severity of an issue impacting the service. In another embodiment, the size of the tile may increase from a medium tile to a large tile. In such an embodiment, the GUI 500 may adjust the appearance of the tile to display a KPI associated with the service along with the minimalistic view of the service map and the indication of the severity of the issue impacting the service. In another example, as GUI 500 decreases the size of the tile displayed within the services dashboard 502, certain types of data may be removed from the appearance of the tile. In one embodiment, the size of the tile may decrease from a large tile to a medium tile. In such an embodiment, the GUI 500 may adjust the appearance of the tile to remove the KPI associated with the service from the tile. In another embodiment, the size of the tile may decrease from a medium tile to small tile. In such an embodiment, the GUI 500 may adjust the appearance of the tile to remove the minimalistic view of the service map from the tile. Although the description above refers to adding or removing a minimalistic view of a service map, a KPI, or both, when the size of each tile is adjusted in the services dashboard 502, it should be understood that any other suitable data associated with the service represented by the tile may be added or removed upon adjusting the size of each tile.

Figure 10:
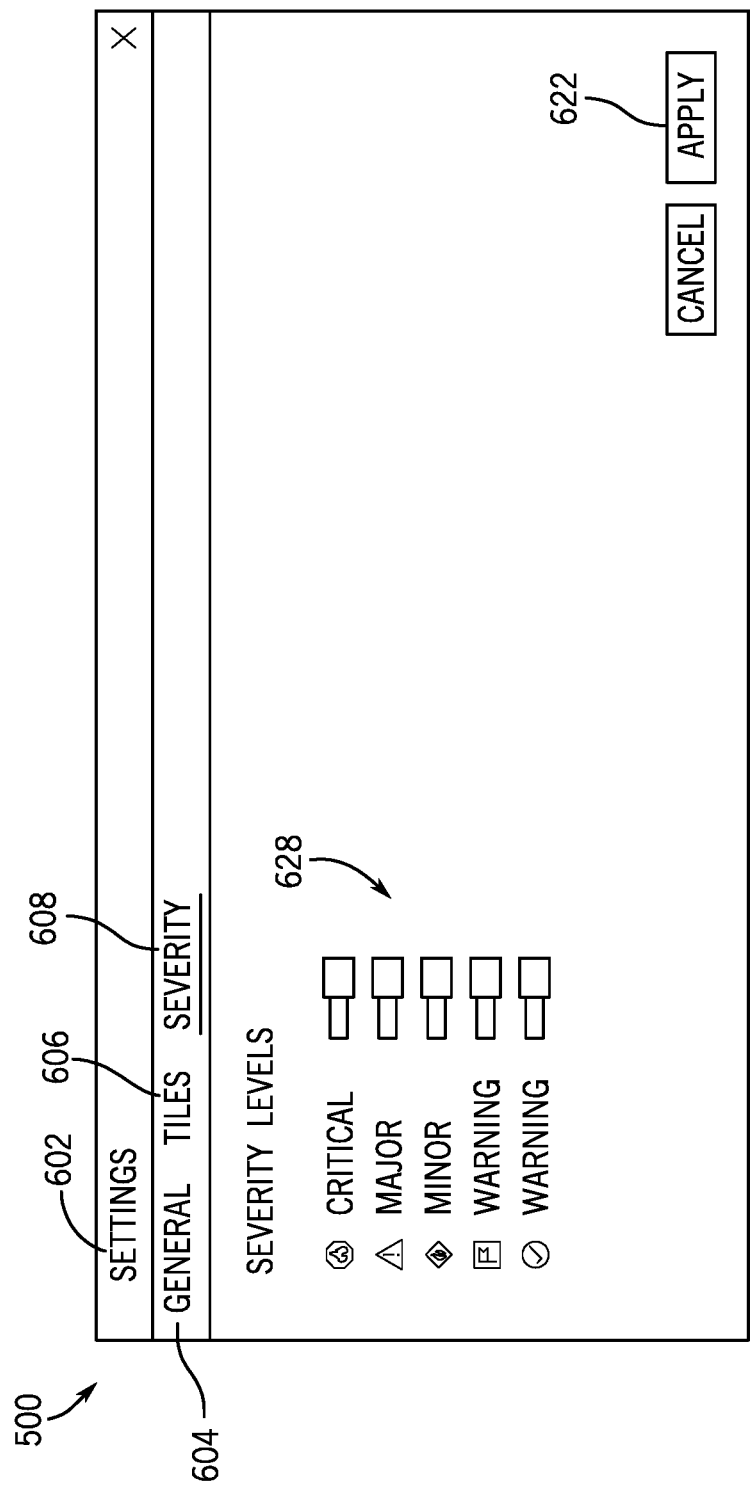
FIG. 10 illustrates the services window of FIG. 6 displaying additional customization options associated with the services dashboard of FIG. 5, in accordance with aspects of the present disclosure.
Figure 11:
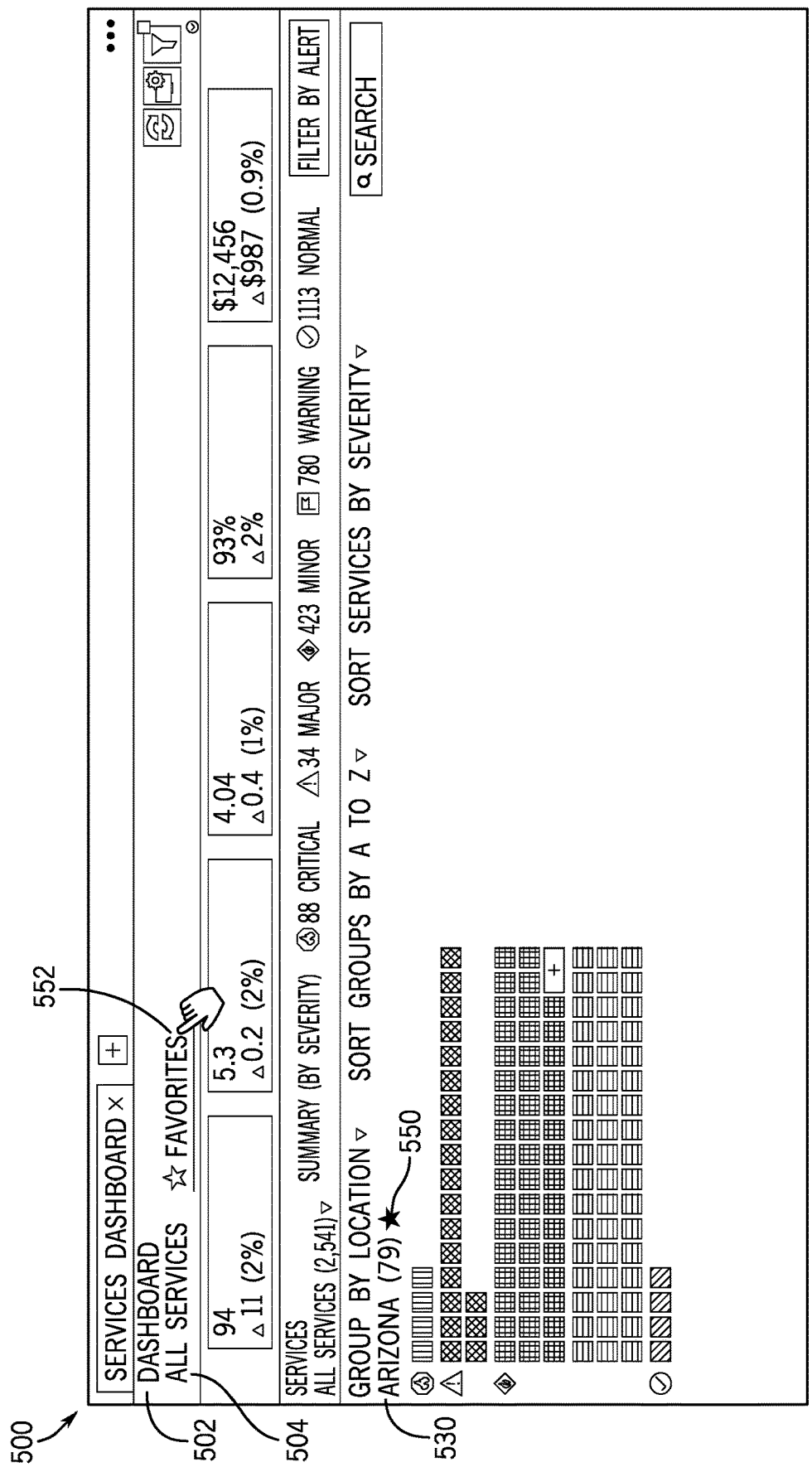
FIG. 11 illustrates the services dashboard of FIG. 5 displaying a set of services having common attributes in a favorites tab, in accordance with aspects of the present disclosure.

Further, FIG. 10 illustrates the settings window 602 displayed by the GUI 500 and presenting various customization options associated with the services dashboard 502 via the "Severity" settings tab 608. In the illustrated embodiment, the user may toggle the display of each type of service having a respective severity level via one or more toggle options 628. For example, the user may select which services to display based on the severity of the issues impacting them. The user may select a critical toggle option, a major toggle option, a minor toggle option, a warning toggle option, a warning toggle option, or a combination thereof, to display a desired subset of services in the services dashboard 502. In this way, the user may easily filter the type of services (e.g., tiles) displayed in the services dashboard 502 to focus on addressing issues impacting those services.

Figure 12:
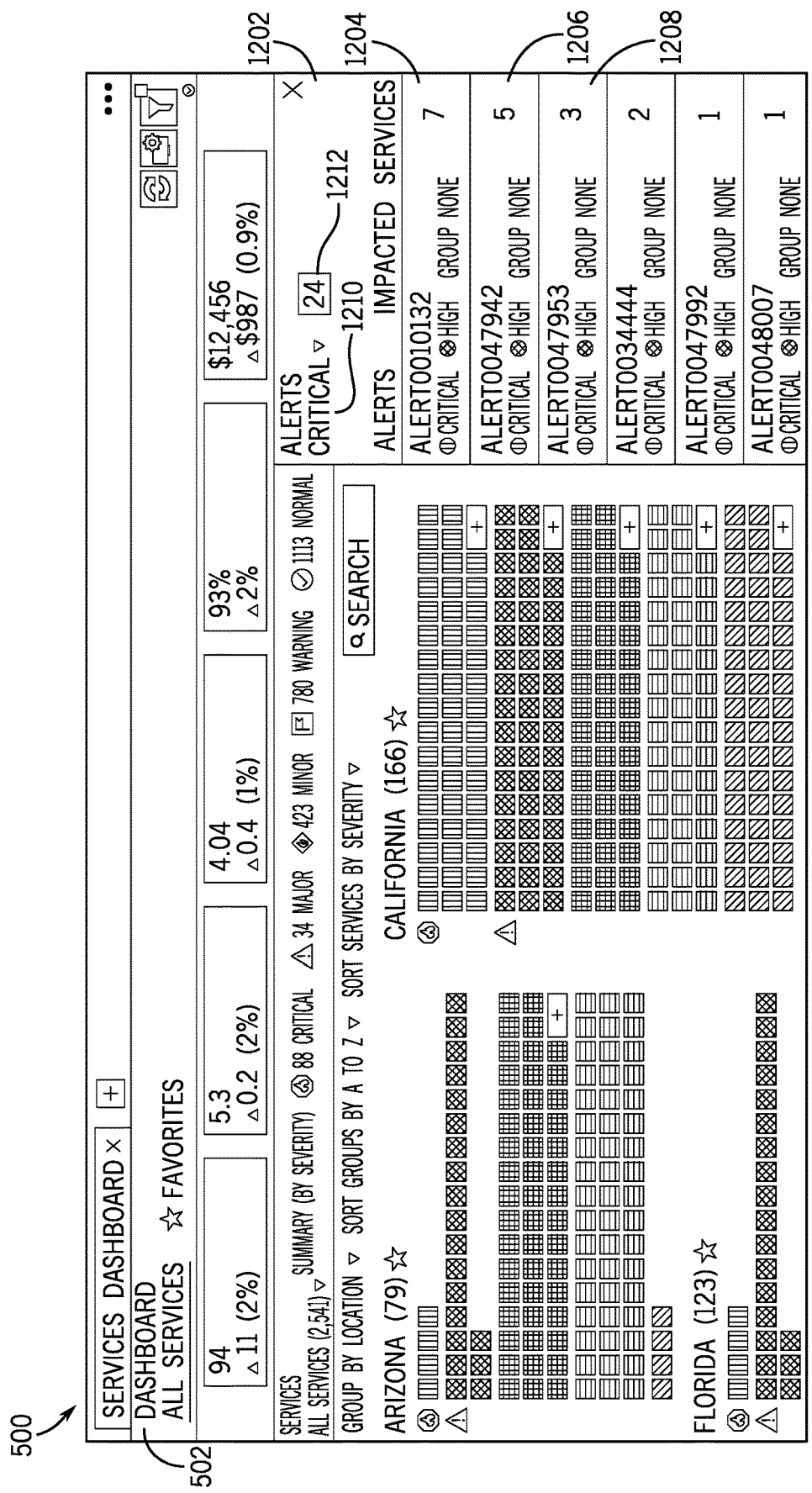
FIG. 12 illustrates the services dashboard of FIG. 5 displaying an issue side panel that filters the services by issues impacting the services, in accordance with aspects of the present disclosure.

After displaying the services associated with the enterprise or grouping and sorting the services associated with the enterprise, the user may identify a subset of the services of interest to the user. As described above, the user may "favorite" a particular group of services displayed in the services dashboard 502 via the star graphical icon 550. FIG. 12 illustrates the services dashboard 502 displaying the subset 530 of services that was "favorited" by the user in the favorites tab 552 of the services dashboard 502. For example, the user may select the star graphical icon 550 next to the Arizona group 530 of services in the all services tab 504 in the services dashboard 502 (e.g., as displayed in FIG. 5). The user may then navigate to the favorites tab 552 in the services dashboard 502 to view the favorited Arizona group 530 of services. In some embodiments, the user may group and sort the favorited Arizona group 530 of services in similar manners as described above (e.g., sort within the group alphabetically, reverse alphabetically, or the like, sort the services of the group by severity or priority). In this way, the services dashboard 502 may increase an efficiency in providing the user with data of interest to the user.

As mentioned above, the user may filter the services displayed in the services dashboard 502 by a particular issue (e.g., alert) affecting one or more of the services by selecting a filter by alert option 554. FIG. 12 illustrates the services dashboard 502 displaying an issue side panel 1202 that lists each issue 1204, 1206, 1208 impacting services of the enterprise. In the illustrated embodiment, the issue side panel 1202 may sort the issues 1204, 1206, 1208 listed by the number of impacted services from most to least. In other embodiments, however, it should be understood that the services dashboard 502 may provide the user with any other suitable manner of sorting the list of issues 1204, 1206, 1208. For example, the issues may be sorted by severity or by priority in the issue side panel 1202. In any case, the issue side panel 1202 may also display a set of data associated with each issue 1204, 1206, 1208. For example, the data may include the name of the issue, a description of the issue, the group name that the issue is a part of, if any, the severity of the issue, the priority of the issue, the number of services the issues impacts, or the like.

The issue side panel 1202 may also include a filter option 1210 and a numerical control option 1212. The filter option 1210 may be a drop-down list of different categories of severities that a respective issue may be categorized as. After a user selects a particular category in the drop-down list of the filter option 1210, the GUI 500 may adjust the type of issues displayed in the issue side panel 1202 to the issues associated with the selected category. For example, the user may select critical issues, major issues, minor issues, warning issues, or no issues (e.g., "normal") from the drop down list of the filter option 1210. The GUI 500 may then display issues impacting services corresponding to the selected category in the issue side panel 1202. The numerical control option 1212 may limit the number of issues displayed within the list presented in the issue side panel 1202 to the user. In the illustrated embodiment, for example, the number of issues displayed in the issue side panel 1202 may be limited to 24. In some embodiments, the user may be able to adjust the number of issues displayed within the list via the numerical control option 1212. For example, the user may be able to enter in a desired number of issues to display or select from various numerical options presented to the user via numerical control option 1212.

Figure 13:
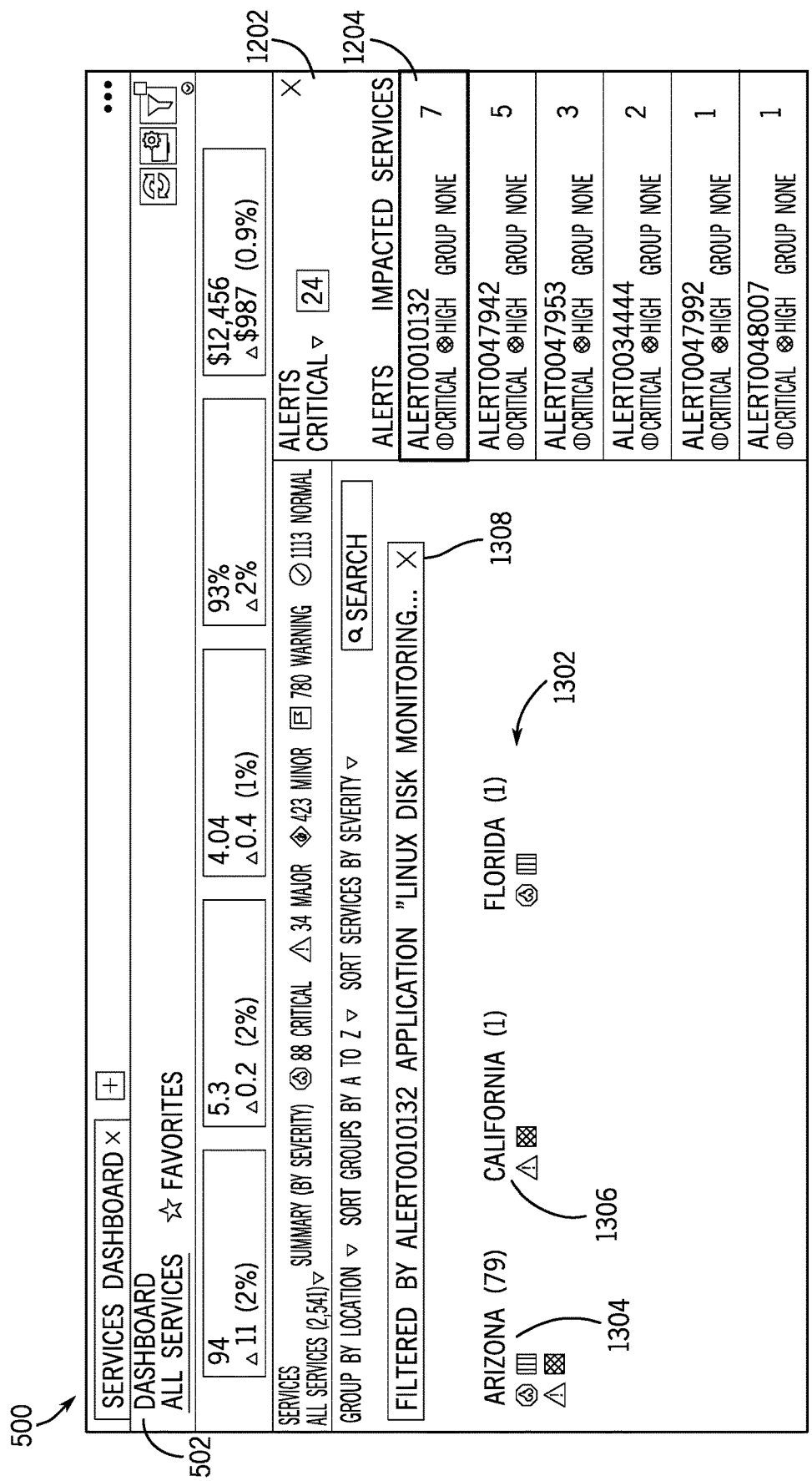
FIG. 13 illustrates the services dashboard of FIG. 5 displaying services of the enterprise impacted by a particular issue selected by a user from the issue side panel, in accordance with aspects of the present disclosure.

In certain embodiments, the user may wish to view the impacted services by a particular issue in the services dashboard 502. For example, the user may wish to view the services impacted by issue 1204 in either a list form or a tile form in the services dashboard 502. FIG. 13 illustrates the services dashboard 502 displaying the services 1302 impacted by the issue 1204 after the user has selected the issue 1204 from the issue side panel 1202. After selection of the issue 1204 by the user, a filter 1308 corresponding to the selected issue may be applied to the services displayed in the services dashboard 502. As a result, the services 1302 impacted by the selected issue 1204 may be displayed in the services dashboard 502 after the user selected the issue 1204 from the issue side panel 1202. The user may further group, sort, or filter the services displayed in the services dashboard 502 according to the techniques described herein. For example, the services 1302 impacted by the selected issue may be grouped by location into an Arizona group 1304 of services and a California group 1306 of services. In some embodiments, the user may select multiple issues in the issue side panel 1202, and a filter corresponding to the selected issues may be applied to the services displayed in the services dashboard 502. For example, the services dashboard 502 may display services associated with two issues, three issues, four issues, or more issues, based on the number of issues selected by the user in the issues side panel 1202.

Figure 14:
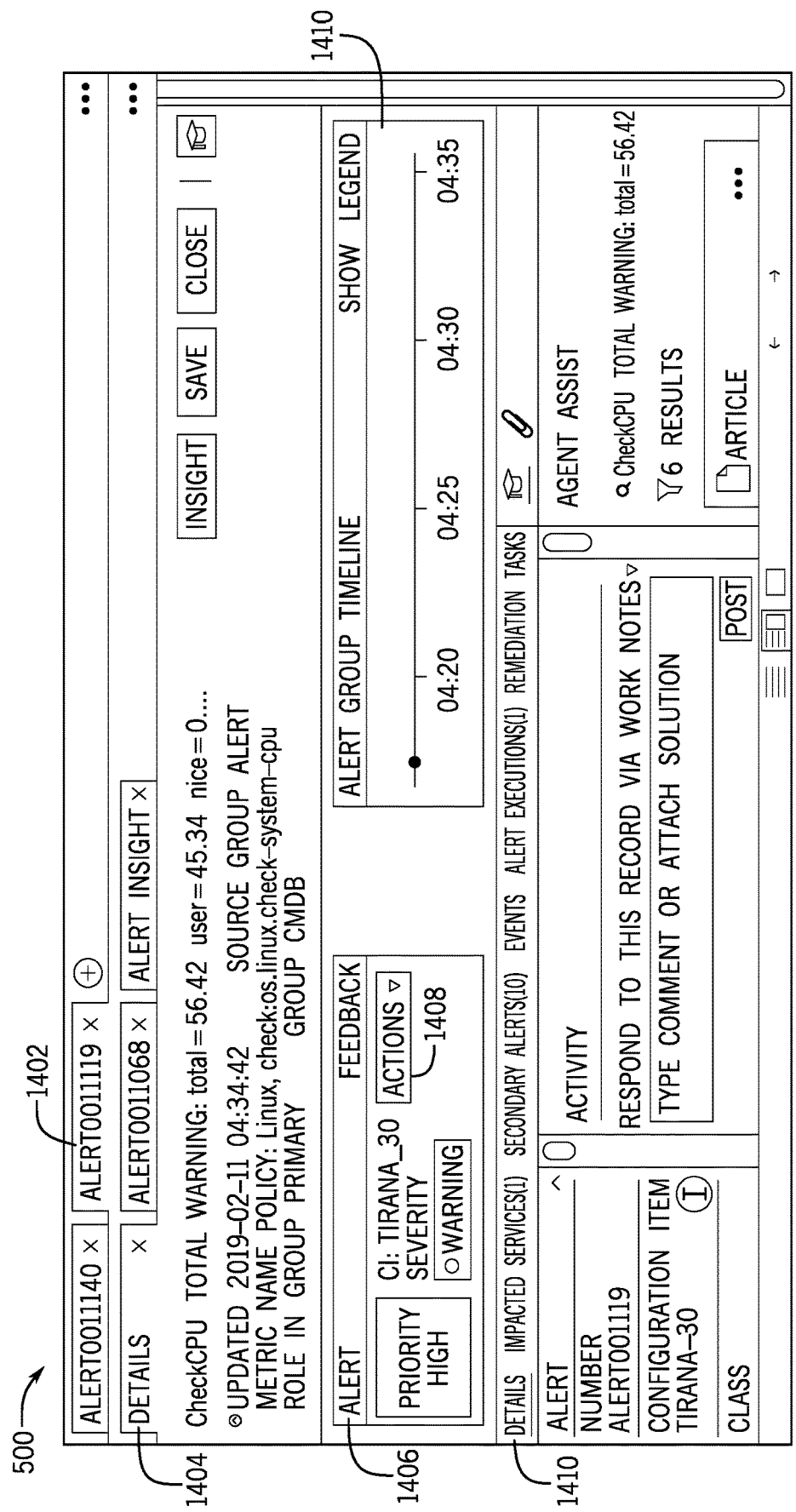
FIG. 14 illustrates an issue record window that may be displayed in response to a user selection of the particular issue from the issue side panel, in accordance with aspects of the present disclosure.

In some embodiments, the user may wish to access additional details associated with a particular issue impacting services associated with the enterprise. For example, the data associated with each issue listed in the issue side panel 1202 may be stored in an issue record in a database. FIG. 14 illustrates an issue record window 1402 that may be displayed by the GUI 500 in response to a user selecting an issue (e.g., 1204) in the issue side panel 1202. The issue record window 1402 may include data associated with the record in a header section 1404 of the issue record window 1402. For example, the data in the header section 1404 may include the name of the issue, a description of the issue, a timestamp associated with the date and time the issue record was last updated, the source of the issue, or the like. The issue record window 1402 may also include indications of one or more attributes (e.g., a priority level, a severity level, the configuration item associated with the issue, or the like) in an alert section 1406 of the issue record window 1402. The alert section 1406 may also include a drop-down list of one or more actions (e.g., close the issue, change the status of the issue, open an INT, send the issue to another user, open a monitoring tool associated with the issue, execute a remediation action, view related knowledge articles, provide feedback, or the like) the user may take from the issue record window 1402 to address the issue. In this way, the disclosed techniques may facilitate resolution of issues impacting one or more services of an enterprise from the services dashboard 502 instead of requiring the user to navigate to through other tools or interfaces to perform similar actions.

Additionally, the issue record window 1402 may include a timeline 1410 of the issue. For example, the timeline 1410 may indicate how and when the issue was created, and one or more tasks implemented by the user or other personnel toward resolution of the issue. It should be understood, however, that the timeline 1410 may indicate any other suitable information that may be utilized by the user in understanding, analyzing, and resolving the issue associated with the issue record. The issue record window 1402 may also include additional data associated with the issue sorted within various tabs 1410. For example, the issue record window 1402 may provide the user with the identification number of the issue, the name of a configuration item associated with the issue, the class of the issue, the names and details of services impacted by the issue, secondary alerts associated with the issue, events associated with the issue, alert executions associated with the issue, remediation tasks associated with the issue, or the like.

Figure 15:
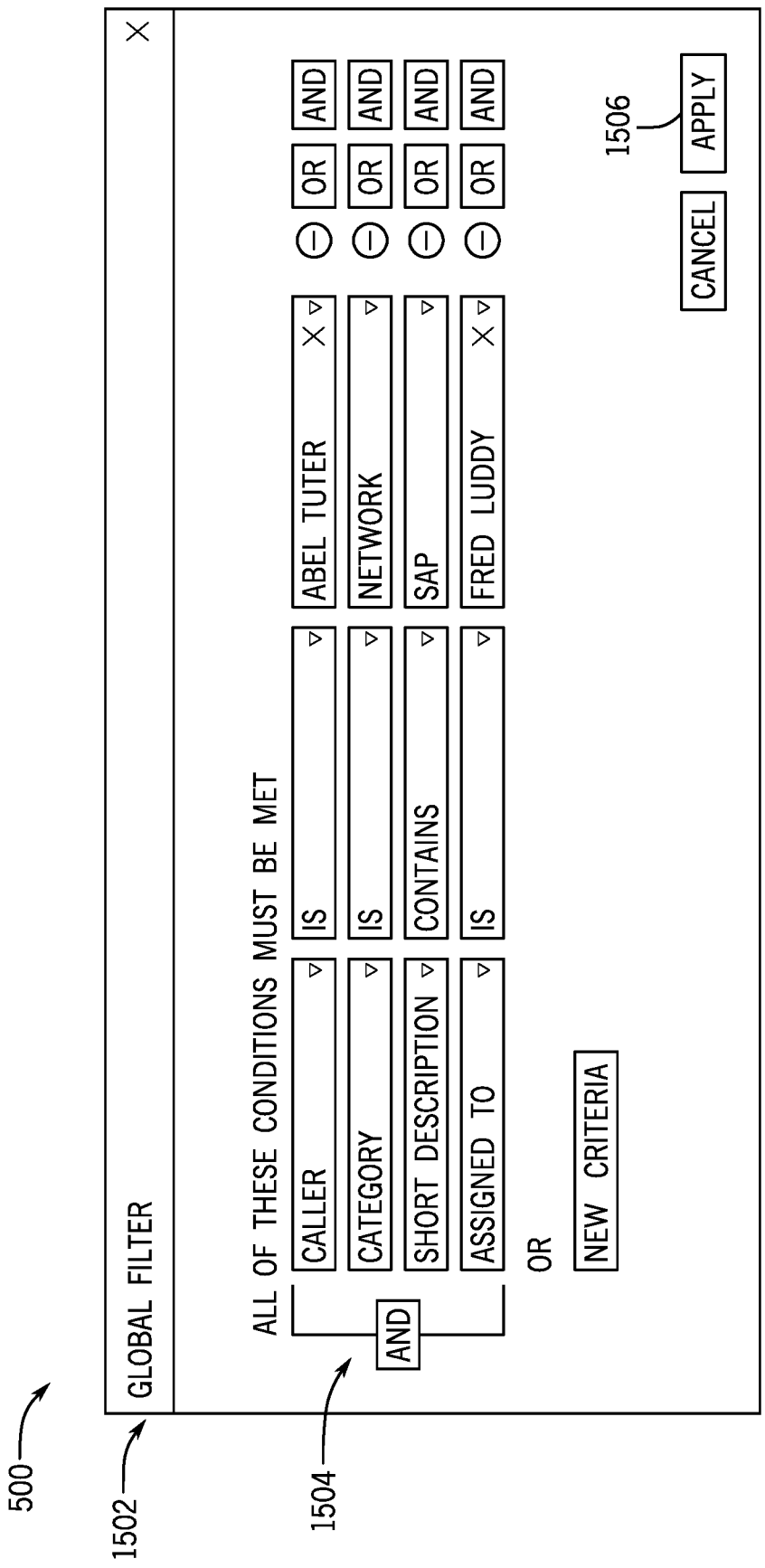
FIG. 15 illustrates a filter window that may be utilized by a user to filter the services displayed to the user within the services dashboard of FIG. 5, in accordance with aspects of the present disclosure.

Referring back to FIG. 5, the user may wish to apply a global filter to the services displayed to the user in the services dashboard 502. For example, the user may wish to look for a particular service or a subset of services with one or more common attributes. FIG. 15 illustrates a global filter window 1502 that may be displayed by the GUI 500 in response to the user selecting a global filter icon 562 in the services dashboard 502. The global filter window 1502 may include one or more attributes associated with a service that the user may add to global filter, one or more Boolean operators (e.g., "is", "contains", "without") that the user may select to define the added attributes, and target data that the user may input in corresponding fields associated with the attributes. In some embodiments, the user may add one, two, three, four, or any other suitable attributes to the global filter. After defining the global filter with the one or more attributes, Boolean operators, and target data, and selecting the "apply" option 1506 to confirm the user's selections, the GUI 500 may apply the global filter to the services displayed to the user in the services dashboard 502. In the illustrated embodiment, for example, the GUI 500 may display services assigned to "Fred Luddy", having a short description that contains "SAP", and/or having the category "Network".

Figure 16:
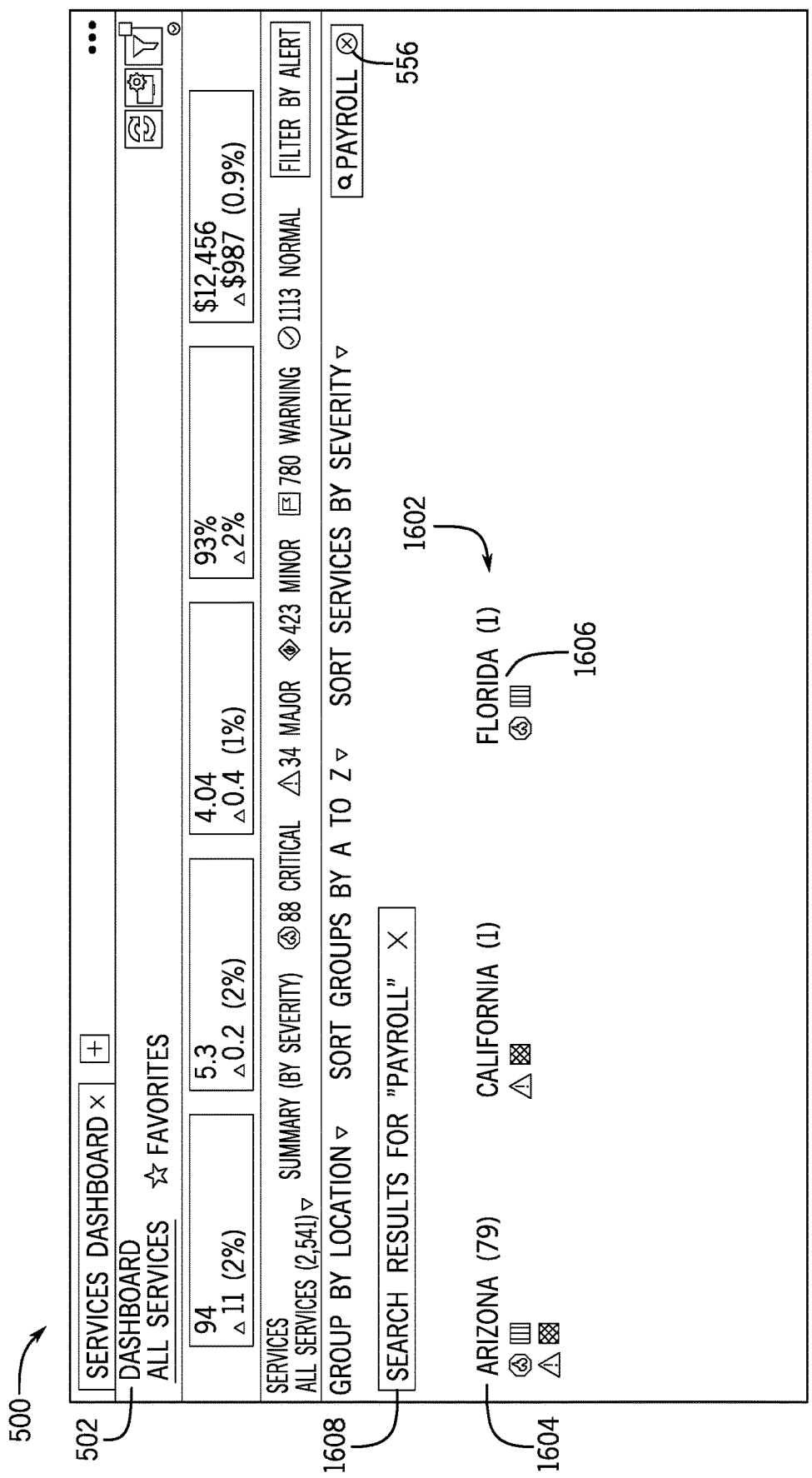
FIG. 16 illustrates the services dashboard of FIG. 5 that displays services of the enterprise associated with a search query by the user, in accordance with aspects of the present disclosure.

In some embodiments, the user may wish to perform a global search of the services associated with the enterprise for a particular word or phrase. FIG. 16 illustrates the services dashboard 502 displaying services as a result of a global search query performed by the user via the search field 556. In the illustrated embodiment, for example, the user may wish to perform a global search of all services associated with the enterprise for the term "payroll". After the user inputs the term "payroll" in the search field 556, the GUI 500 may display services 1602 in the services dashboard 502 that have the term "payroll" associated with the service. For example, the term "payroll" may appear in a service record or an issue record associated with one or more services in the Arizona group 1604 of services and the Florida group 1606 of services. The user may revert the display to all the services associated with the enterprise in the services dashboard by selecting the 'x' in the search result indicator 1608.

The GUI 500 may also provide additional data based on various interactions by the user with the tiles representing respective services in the services dashboard 502. For example, the user may hover a mouse arrow over a tile representing a service to display a snapshot view of the service indicating one or more attributes of the service. The user may also select the tile representing the service to display a service preview window (e.g., as an overlay) that contains additional data associated with the service as compared to the snapshot view. From the service preview window, the user may access a service record, a service map, or both, associated with the service to access additional data associated with the service or to perform tasks toward resolution of issues associated with the service.

Figure 17:
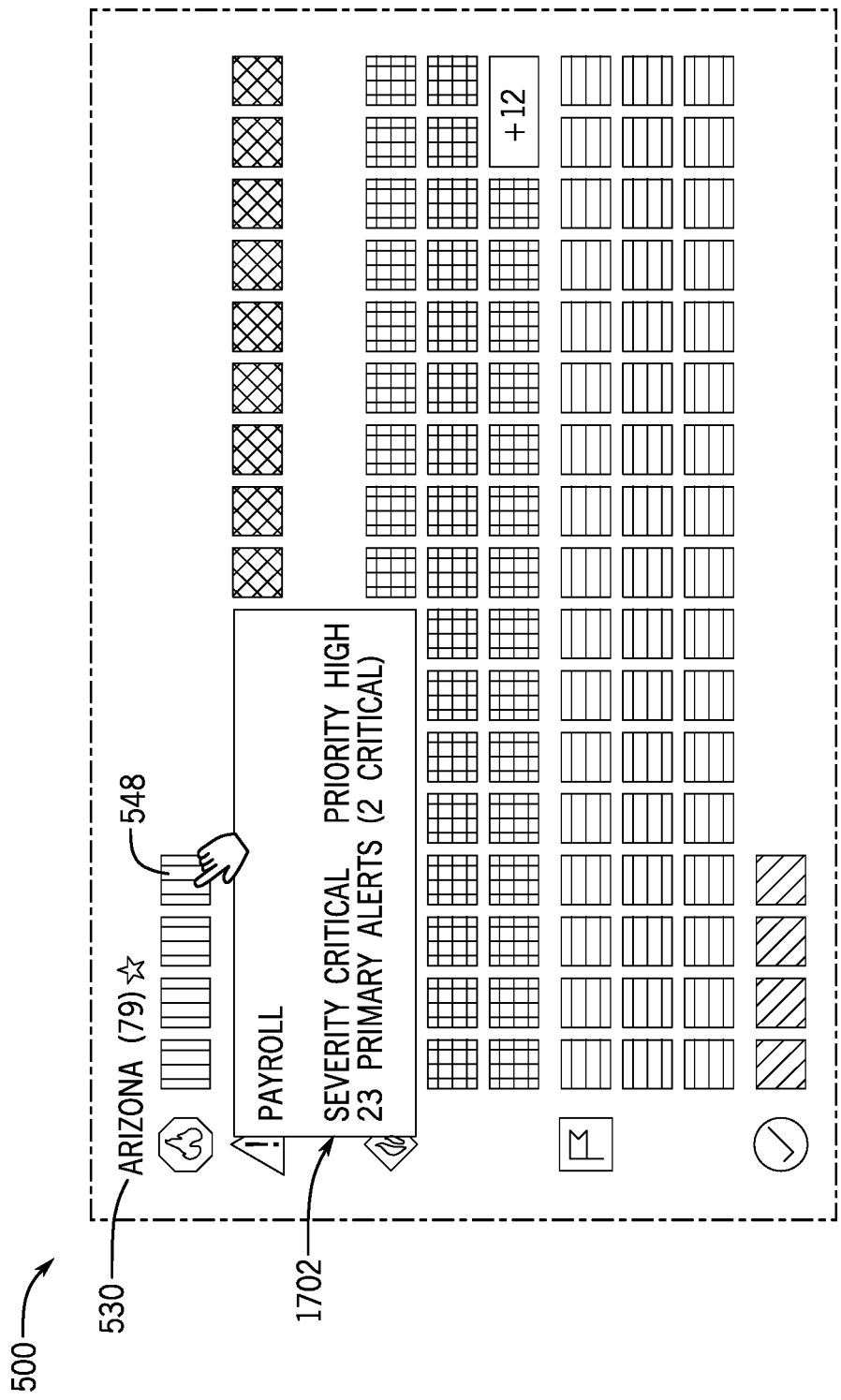
FIG. 17 illustrates a service snapshot displaying data associated with a service in response to the user hovering a mouse over a service tile in the services dashboard of FIG. 5, in accordance with aspects of the present disclosure.

With the foregoing in mind, FIG. 17 illustrates a snapshot window 1702 associated with a service displaying various types of data within the snapshot window 1702. As described above, the user may hover a mouse arrow over the tile 548 to display the snapshot window 1702. The snapshot window 1702 may contain data associated with various attributes of the service. In the illustrated embodiment, for example, the snapshot window 1702 may contain the name of the service, the severity of an issue impacting the service, the priority of the service, the number of issues or alerts associated with the service, or the like.

Figure 18:
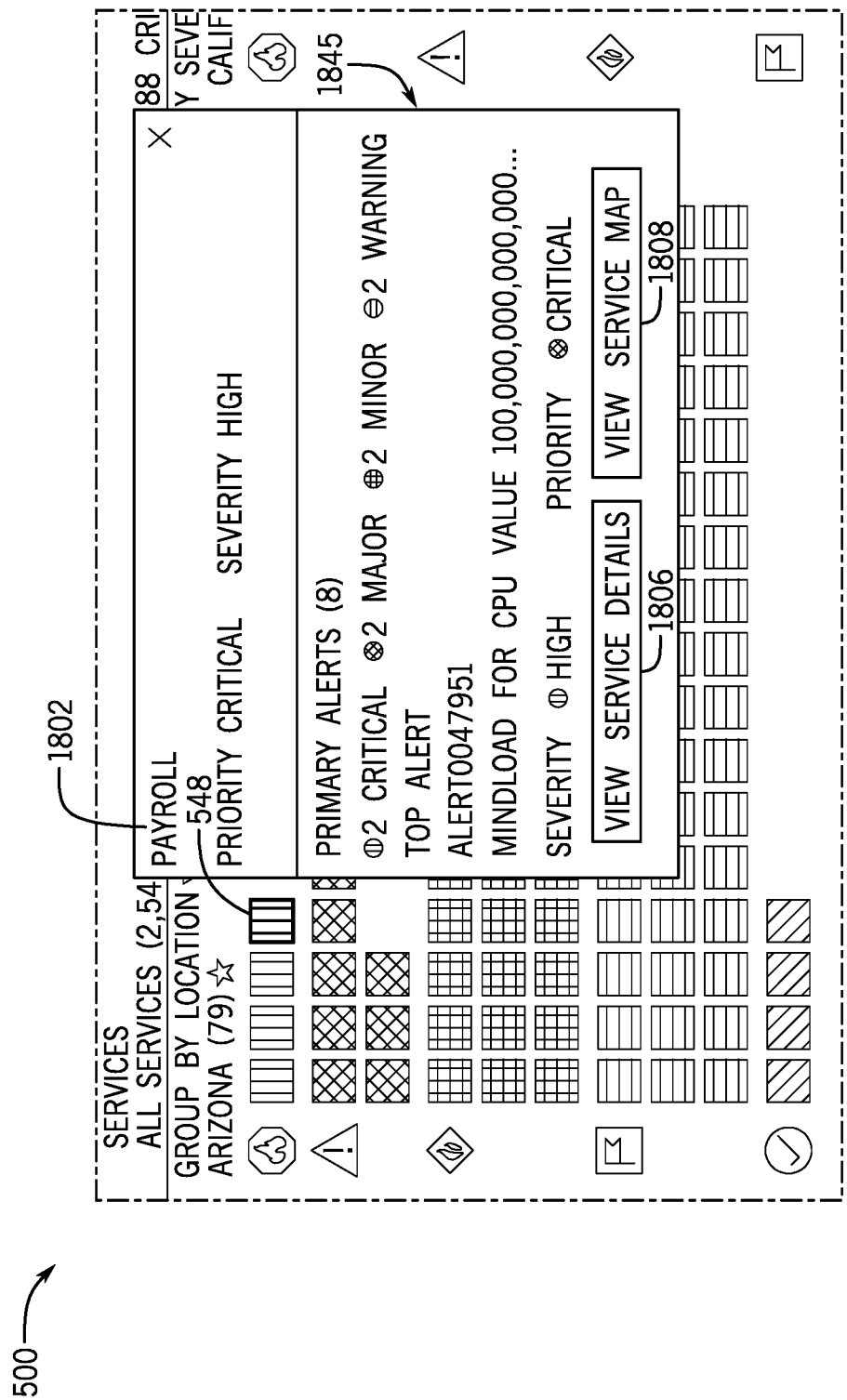
FIG. 18 illustrates a service preview window displaying data associated with a service in response to the user selecting the service tile in the services dashboard of FIG. 5, in accordance with aspects of the present disclosure.

FIG. 18 illustrates a service preview window 1802 that may be displayed by the GUI 500 in response to a user selection of a tile 548 in the services dashboard 502. The service preview window 1802 may display more data associated with the service than the snapshot window 1702 described above. In the illustrated embodiment, for example, the service preview window 1802 may display one or more attributes associated with the service (e.g., the name of the service, the severity of an issue impacting the service, the priority of the service, or the like), data associated with one or more issues impacting the service with the highest severity and/or the highest priority, and a minimalistic view of a service map associated with the service. It should be noted, however, that the illustrated embodiment is intended to be exemplary and that, in other embodiments, the service preview window 1802 may display different types of data associated with the service or additional data associated with the service.

The service preview window 1802 may also provide the user with a service record link 1806 to view the service record of the service and a service map link 1808 to view the service map of the service. FIG. 19 illustrates the service record window 1904 that may be accessed by the user from the service preview window 1802 via selection of the service record link 1806. The GUI 500 may display the service record window 1904 in a service tab 1902 adjacent to the services dashboard tab 502. In this way, the user may easily switch between the service tab 1902 and the services dashboard tab 502 without leaving the GUI 500 to access other tools or graphical user interfaces to perform similar actions provided via the tabs. The service record window 1904 may display various types of data associated with the service. In the illustrated embodiment, for example, the service record window 1904 may display the name of the service, the status of the service, the owner of the service, the number of INTs associated with the service, the number of PRBs associated with the service, and one or more tabs displaying other types of data associated with the service. The tabs may be selectable by the user to display different types of data associated with the service in the service record window 1904. For example, the tabs may display general information associated with the service as described above, entry points associated with the service, a list of configuration items associated with the service, alerts related to the service, INTs related to the service, PRBs related to the service, or the like. In the illustrated embodiment, the user may also be able to edit the service record data from the service record window 1904.

Figure 20:
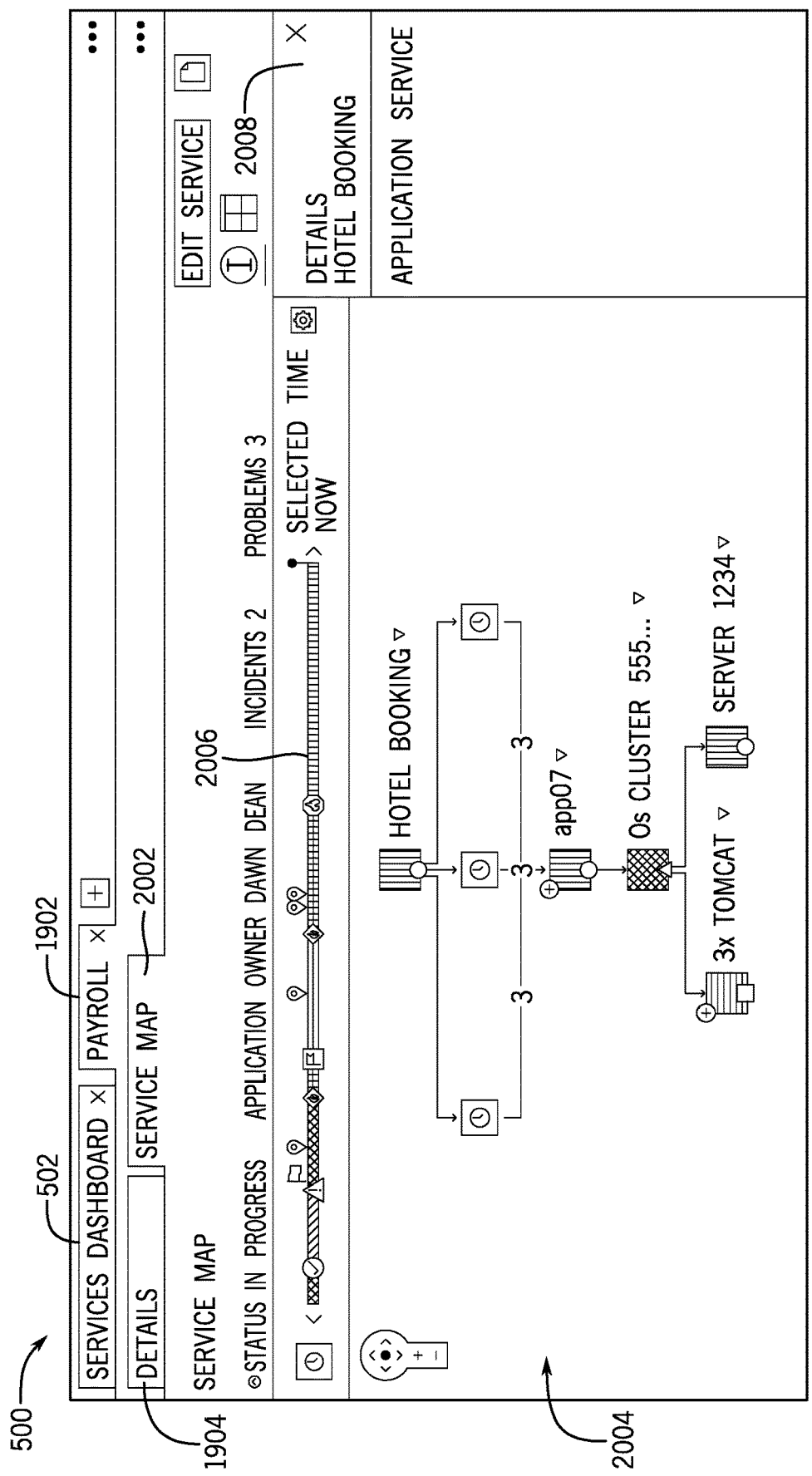
FIG. 20 illustrates a service map that may be accessed by the user from the service preview window of FIG. 17, in accordance with aspects of the present disclosure.

FIG. 20 illustrates a service map window 2002 that may be accessed by the user from the service preview window 1802 via selection of the service map link 1808. Similar to the service record window 1904, the GUI 500 may display the service map window 2002 in a service tab 1902 positioned adjacent to the services dashboard 502. In this way, the user may be able to quickly and easily switch between the windows associated with a particular service tab and the services dashboard. In the illustrated embodiment, the service map window 2002 includes a service map header, a service map timeline 2006, a service map 2004, and a service details panel 2008. The service map header may include various attributes associated with the service (e.g., the name of the service, the status of the service, the owner, of the service, the number of INTs, the number of PRBs, or the like). The service map timeline 2006 may include a history of the service from the time the service was created to the present time. For example, the service map timeline 2006 may indicate the severity of any issues impacting the service over various time periods and the changes of severity of the issues impacting the service. The service map timeline 2006 may also indicate any tasks implemented to resolve the issues impacting the service. The service map 2004 may provide a visual representation to the user of one or more CIs, one or more services, and/or one or more operations and the relationships between them. For example, the service map 2004 includes a plurality of tiles connected by one or more lines. Each tile may be representative of a CI, a service, an operation, or the like. In some embodiments, a service represented by a single tile may include multiple sub-services or supporting services. The GUI 500 may also display data associated with a particular service in the service details panel 2008 in response to the user selecting a tile representing the service. For example, the service details panel 2008 may include the name of the service, the type or the category of the service, the operational status of the service, a timestamp indicative of the time and date the service was created, the creator of the service, one or more entry points associated with the service, or the like.

As described above, the disclosed techniques provide a user with a customizable GUI for a dashboard from which the user may access data associated with one or more services of an enterprise. The disclosed techniques facilitate better management and maintenance of the services of an enterprise by providing the user with full flexibility in adjusting the amount of data and the type of data associated with the services displayed to the user via the dashboard. Additionally, the disclosed techniques provide the user with access to various tools to identify issues associated with the services, analyze the impact of each issue, and facilitate resolution of each issue from the dashboard. For example, the GUI may facilitate grouping, sorting, and filtering of tiles in the dashboard that represent respective services of an enterprise by their attributes. As the user interacts with the tiles displayed in the dashboard or customization options associated with the appearance of tiles in the dashboard, the GUI may display more data or less data associated with each service in the displayed tiles. In this way, the GUI may dynamically adjust the amount of data and/or the type of data the user may view in the dashboard based on the user's preferences and/or interactions with the tiles. Additionally, the GUI may provide the user with tools to resolve identified issues via the dashboard without having to access other tools or graphical user interfaces to perform similar actions. As such, the disclosed techniques increase an efficiency in identifying issues associated with services of an enterprise, analyzing the impact of each issue, and facilitating resolution of each issue.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a cloud service platform accessible by a client device via a client network, wherein the cloud service platform is configured to provide a graphical user interface (GUI) to the client device and perform operations comprising:
receiving an indication of a plurality of service records associated with an enterprise from a database, wherein each service record of the plurality of service records corresponds to a service provided by the enterprise;
generate the GUI for display on at least the client device, wherein the GUI comprises a services dashboard including a plurality of graphical icons representative of respective service records of the plurality of service records;
receiving one or more user inputs indicative of an adjustment to a size of one or more graphical icons of the plurality of graphical icons displayed in the services dashboard from the client device;
dynamically modifying the size of the one or more graphical icons to increase from a smaller representation to a larger representation, wherein the smaller representation represents a severity of a respective issue impacting a corresponding service or a lack of an issue impacting the corresponding service, and the larger representation indicates the severity of the respective issue impacting the corresponding service or the lack of the issue impacting the corresponding service and includes a key performance indicator associated with the corresponding service, the respective issue, or both, within the larger representation; and
dynamically modifying the size of the one or more graphical icons to decrease from the larger representation to the smaller representation, comprising removing the key performance indicator associated with the corresponding service, the respective issue, or both.

2. The system of claim 1, wherein the one or more graphical icons are disposed in a plurality of groups associated with an attribute, and wherein the respective service records associated with each group of the plurality of groups have the same attribute.

3. The system of claim 2, wherein the attribute comprises a location, an owner, a category, a domain, a department, a severity, a priority, or a combination thereof.

4. A method, comprising:
receiving, via a cloud service platform, an indication of a plurality of service records associated with an enterprise from a database, wherein each service record of the plurality of service records corresponds to a service provided by the enterprise and the cloud service platform is accessible via a client device via a client network;
generating, via the cloud service platform, a graphical user interface (GUI) for display on a client device, wherein the GUI comprises a services dashboard including a plurality of graphical tiles representing respective service records of the plurality of service records;
receiving one or more user inputs indicative of an adjustment to a size of the plurality of tiles displayed in the services dashboard from the client device;
dynamically modifying, via the cloud-based platform, the size of the plurality of tiles to increase from a smaller representation to a larger representation, wherein the smaller representation represents a severity of a respective issue impacting a corresponding service or a lack of an issue impacting the corresponding service, and the larger representation indicates the severity of the respective issue impacting the corresponding service or the lack of the issue impacting the corresponding service and includes a key performance indicator associated with the corresponding service, the respective issue, or both, within the larger representation; and
dynamically modifying, via the cloud-based platform, the size of the one or more graphical icons to decrease from the larger representation to the smaller representation, comprising removing the key performance indicator associated with the corresponding service, the respective issue, or both.

5. The method of claim 4, wherein the services dashboard includes a plurality of graphical icons associated with each severity level of issues associated with the respective service records, and wherein the plurality of graphical tiles are disposed in rows adjacent to each graphical icon of the plurality of graphical icons based on the respective severity levels of issues associated with the plurality of graphical tiles.

6. The method of claim 4, wherein the services dashboard includes a plurality of graphical icons associated with each priority level associated with the respective service records, and wherein the plurality of graphical tiles are disposed in rows adjacent to each graphical icon of the plurality of graphical icons based on the respective priority levels associated with the plurality of graphical tiles.

7. The method of claim 4, comprising receiving one or more additional user inputs indicative of an interaction with a graphical tile of the plurality of graphical tiles, and modifying the GUI to display additional data associated with the corresponding service record based on the one or more additional user inputs.

8. The method of claim 7, wherein the one or more additional user inputs comprises a mouse hovering over the graphical tile and modifying the graphical user interface to display additional data comprises displaying a snapshot window associated with the corresponding service record at least partially over the services dashboard.

9. The method of claim 7, wherein the one or more additional user inputs comprises a user selection of the graphical tile and modifying the graphical user interface to display additional data comprises displaying a service preview window associated with the corresponding service record at least partially over the services dashboard.

10. The method of claim 9, wherein the service preview window comprises a first link to the corresponding service record, a second link to a service map window associated with the corresponding service record, or both.

11. A tangible, non-transitory, machine-readable medium, comprising instructions that, when executed by one or more processors, cause the one or more processors to:
receive an indication of a plurality of service records associated with an enterprise from a database, wherein each service record of the plurality of service records corresponds to a service provided by the enterprise;
generate a graphical user interface (GUI) for display on a client device, wherein the GUI comprises a services dashboard including the plurality of graphical tiles representing respective service records of the plurality of service records;
receiving one or more user inputs indicative of an adjustment to a size of one or more graphical icons of the plurality of graphical tiles displayed in the services dashboard from the client device;
dynamically modifying the size of the one or more graphical tiles to increase from a smaller representation to a larger representation, wherein the smaller representation represents a severity of a respective issue impacting a corresponding service or a lack of an issue impacting the corresponding service, and the larger representation indicates the severity of the respective issue impacting the corresponding service or the lack of the issue impacting the corresponding service and the includes a key performance indicator associated with the corresponding service, the respective issue, or both, within the larger representation; and
dynamically modifying the size of the one or more graphical icons to decrease from the larger representation to the smaller representation, comprising removing the key performance indicator associated with the corresponding service, the respective issue, or both.

12. The tangible, non-transitory, machine-readable medium of claim 11, comprising instructions that cause the one or more processors to:
receive one or more additional user inputs indicative of applying a filter to the plurality of graphical icons displayed in the services dashboard, wherein the filter is associated with an issue associated with a subset of the respective service records; and
modify the GUI to display a subset of the plurality of graphical icons associated with the subset of the respective service records.

13. The system of claim 1, wherein the operations comprise dynamically modifying the size of the one or more graphical icons to increase from the larger representation to an additional larger representation, wherein the additional larger representation indicates the severity of the respective issue impacting the corresponding service or the lack of the issue impacting the corresponding service, includes the key performance indicator associated with the corresponding service, the respective issue, or both, within the additional larger representation, and includes a service map associated with the corresponding service within the additional larger representation.

14. The system of claim 13, wherein the operations comprise dynamically modifying the size of the one or more graphical icons to decrease from the additional larger representation to the larger representation.

15. The system of claim 13, wherein the operations comprise dynamically modifying the size of the one or more graphical icons to decrease from the additional larger representation to the smaller representation.

* * * * *